(12) United States Patent
Takayama

(10) Patent No.: US 10,654,542 B2
(45) Date of Patent: May 19, 2020

(54) SHIFTING CONTROL APPARATUS FOR HUMAN POWERED VEHICLE

(71) Applicant: SHIMANO INC., Sakai (JP)

(72) Inventor: Hitoshi Takayama, Sakai (JP)

(73) Assignee: SHIMANO INC., Sakai (JP)

( * ) Notice: Subject to any disclaimer, the term of this patent is extended or adjusted under 35 U.S.C. 154(b) by 106 days.

(21) Appl. No.: 15/941,001

(22) Filed: Mar. 30, 2018

(65) Prior Publication Data

US 2019/0300110 A1    Oct. 3, 2019

(51) Int. Cl.
| | |
|---|---|
| *B62M 9/122* | (2010.01) |
| *B62M 25/08* | (2006.01) |
| *F16H 61/02* | (2006.01) |
| *B60W 10/11* | (2012.01) |

(52) U.S. Cl.
CPC ............ *B62M 9/122* (2013.01); *B62M 25/08* (2013.01); *B60W 10/11* (2013.01); *B60W 2300/36* (2013.01); *B60W 2510/10* (2013.01); *B60W 2710/10* (2013.01); *F16H 61/0204* (2013.01)

(58) Field of Classification Search
CPC ... B62M 9/122; B62M 25/08; F16H 61/0204; B60W 10/11; B60W 2300/36; B60W 2510/10; B60W 2710/10

USPC ..................................................... 701/57, 64
See application file for complete search history.

(56) References Cited

U.S. PATENT DOCUMENTS

| | | | |
|---|---|---|---|
| 8,360,909 B2 * | 1/2013 | Ichida ................... | B62M 25/08 474/69 |
| 10,442,497 B2 * | 10/2019 | Chien ................... | B62M 9/122 |
| 2016/0096589 A1 | 4/2016 | Sato | |
| 2018/0118211 A1 * | 5/2018 | Tsuchizawa ......... | B60W 10/08 |

* cited by examiner

*Primary Examiner* — Roger L Pang
(74) *Attorney, Agent, or Firm* — Mori & Ward, LLP

(57) ABSTRACT

A shifting control apparatus for a human powered vehicle comprises a position sensor and a transmission controller. The position sensor is configured to sense a rotational position of a plurality of sprockets relative to a rotational reference position. The transmission controller is configured to control a derailleur to move a chain guide of the derailleur relative to the plurality of sprockets in a shifting operation. The transmission controller is configured to change at least one of a speed relating to a movement of the chain guide, a start timing relating to the movement of the chain guide, and a distance relating to the movement of the chain guide based on a target shifting-operation position of the plurality of sprockets, and the rotational position sensed as an actual shifting-operation position by the position sensor at an actual timing of the shifting operation.

16 Claims, 22 Drawing Sheets

FIG. 9

| SPROCKET | CURRENT SHIFT POSITION | SHIFT OPERATION SIGNAL | SHIFTING FACILITATION STRUCTURE | SELECTION ANGULAR RANGE AR [DEGREES] | TARGET SHIFTING-OPERATION POSITION PT [DEGREES] | REFERENCE POSITIONAL DIFFERENCE PD0 [DEGREES] |
|---|---|---|---|---|---|---|
| S1 | S1 | UPSHIFT (S1 → S2) | FSU11 | $0 \leq ARU11 < 90$ | PTU11 | PDU11 |
| | | | FSU12 | $90 \leq ARU12 < 180$ | PTU12 | PDU12 |
| | | | FSU13 | $180 \leq ARU13 < 270$ | PTU13 | PDU13 |
| | | | FSU14 | $270 \leq ARU14 < 360$ | PTU14 | PDU14 |
| | S2 | DOWNSHIFT (S1 ← S2) | FSD11 | $60 \leq ARD11 < 150$ | PTD11 | PDD11 |
| | | | FSD12 | $150 \leq ARD12 < 240$ | PTD12 | PDD12 |
| | | | FSD13 | $240 \leq ARD13 < 330$ | PTD13 | PDD13 |
| | | | FSD14 | $330 \leq ARD14 \leq 360$ $0 \leq ARD14 < 60$ | PTD14 | PDD14 |
| S2 | S2 | UPSHIFT (S2 → S3) | FSU21 | $0 \leq ARU21 < 90$ | PTU21 | PDU21 |
| | | | FSU22 | $90 \leq ARU22 < 180$ | PTU22 | PDU22 |
| | | | FSU23 | $180 \leq ARU23 < 270$ | PTU23 | PDU23 |
| | | | FSU24 | $270 \leq ARU24 < 360$ | PTU24 | PDU24 |
| | S3 | DOWNSHIFT (S2 ← S3) | FSD21 | $60 \leq ARD21 < 150$ | PTD21 | PDD21 |
| | | | FSD22 | $150 \leq ARD22 < 240$ | PTD22 | PDD22 |
| | | | FSD23 | $240 \leq ARD23 < 330$ | PTD23 | PDD23 |
| | | | FSD24 | $330 \leq ARD24 \leq 360$ $0 \leq ARD24 < 60$ | PTD24 | PDD24 |
| S3 | S3 | UPSHIFT (S3 → S4) | FSU31 | $0 \leq ARU31 < 90$ | PTU31 | PDU31 |
| | | | FSU32 | $90 \leq ARU32 < 180$ | PTU32 | PDU32 |
| | | | FSU33 | $180 \leq ARU33 < 270$ | PTU33 | PDU33 |
| | | | FSU34 | $270 \leq ARU34 < 360$ | PTU34 | PDU34 |
| | S4 | DOWNSHIFT (S3 ← S4) | FSD31 | $60 \leq ARD31 < 150$ | PTD31 | PDD31 |
| | | | FSD32 | $150 \leq ARD32 < 240$ | PTD32 | PDD32 |
| | | | FSD33 | $240 \leq ARD33 < 330$ | PTD33 | PDD33 |
| | | | FSD34 | $330 \leq ARD34 \leq 360$ $0 \leq ARD34 < 60$ | PTD34 | PDD34 |

| CURRENT SHIFT POSITION | SHIFT OPERATION SIGNAL | SPEED VR [MM/SEC] | CORRECTION VALUE VC [MM/SEC] | ORIGINAL SPEED VO [MM/SEC] |
|---|---|---|---|---|
| S1 | UPSHIFT (S1 → S2) | VRU1 | VCU1 | VOU1 |
| S2 | DOWNSHIFT (S1 ← S2) | VRD1 | VCD1 | VOD1 |
| S2 | UPSHIFT (S2 → S3) | VRU2 | VCU2 | VOU2 |
| S3 | DOWNSHIFT (S2 ← S3) | VRD2 | VCD2 | VOD2 |
| S3 | UPSHIFT (S3 → S4) | VRU3 | VCU3 | VOU3 |
| S4 | DOWNSHIFT (S3 ← S4) | VRU3 | VCD3 | VOD3 |
| S4 | UPSHIFT (S4 → S5) | VRD4 | VCU4 | VOU4 |
| S5 | DOWNSHIFT (S4 ← S5) | VRU4 | VCD4 | VOD4 |
| S5 | UPSHIFT (S5 → S6) | VRD5 | VCU5 | VOU5 |
| S6 | DOWNSHIFT (S5 ← S6) | VRU5 | VCD5 | VOD5 |
| S6 | UPSHIFT (S6 → S7) | VRU6 | VCU6 | VOU6 |
| S7 | DOWNSHIFT (S6 ← S7) | VRD6 | VCD6 | VOD6 |
| S7 | UPSHIFT (S7 → S8) | VRU7 | VCU7 | VOU7 |
| S8 | DOWNSHIFT (S7 ← S8) | VRD7 | VCD7 | VOD7 |
| S8 | UPSHIFT (S8 → S9) | VRU8 | VCU8 | VOU8 |
| S9 | DOWNSHIFT (S8 ← S9) | VRU8 | VCD8 | VOD8 |
| S9 | UPSHIFT (S9 → S10) | VRD9 | VCU9 | VOU9 |
| S10 | DOWNSHIFT (S9 ← S10) | VRU9 | VCD9 | VOD9 |
| S10 | UPSHIFT (S10 → S11) | VRD10 | VCU10 | VOU10 |
| S11 | DOWNSHIFT (S10 ← S11) | VRU10 | VCD10 | VOD10 |
| S11 | UPSHIFT (S11 → S12) | VRD11 | VCU11 | VOU11 |
| S12 | DOWNSHIFT (S12 ← S11) | VRU11 | VCD11 | VOD11 |

*FIG. 10*

| CURRENT SHIFT POSITION | SHIFT OPERATION SIGNAL | WAITING TIME TW [SEC] | CORRECTION VALUE TC [SEC] | ORIGINAL WAITING TIME TO [SEC] |
|---|---|---|---|---|
| S1 | UPSHIFT (S1 → S2) | TGU1 | TCU1 | TOU1 |
| S2 | DOWNSHIFT (S1 ← S2) | TGD1 | TCD1 | TOD1 |
| S2 | UPSHIFT (S2 → S3) | TGU2 | TCU2 | TOU2 |
| S3 | DOWNSHIFT (S2 ← S3) | TGD2 | TCD2 | TOD2 |
| S3 | UPSHIFT (S3 → S4) | TGU3 | TCU3 | TOU3 |
| S4 | DOWNSHIFT (S3 ← S4) | TGU3 | TCD3 | TOD3 |
| S4 | UPSHIFT (S4 → S5) | TGD4 | TCU4 | TOU4 |
| S5 | DOWNSHIFT (S4 ← S5) | TGU4 | TCD4 | TOD4 |
| S5 | UPSHIFT (S5 → S6) | TGD5 | TCU5 | TOU5 |
| S6 | DOWNSHIFT (S5 ← S6) | TGU5 | TCD5 | TOD5 |
| S6 | UPSHIFT (S6 → S7) | TGU6 | TCU6 | TOU6 |
| S7 | DOWNSHIFT (S6 ← S7) | TGD6 | TCD6 | TOD6 |
| S7 | UPSHIFT (S7 → S8) | TGU7 | TCU7 | TOU7 |
| S8 | DOWNSHIFT (S7 ← S8) | TGD7 | TCD7 | TOD7 |
| S8 | UPSHIFT (S8 → S9) | TGU8 | TCU8 | TOU8 |
| S9 | DOWNSHIFT (S8 ← S9) | TGU8 | TCD8 | TOD8 |
| S9 | UPSHIFT (S9 → S10) | TGD9 | TCU9 | TOU9 |
| S10 | DOWNSHIFT (S9 ← S10) | TGU9 | TCD9 | TOD9 |
| S10 | UPSHIFT (S10 → S11) | TGD10 | TCU10 | TOU10 |
| S11 | DOWNSHIFT (S10 ← S11) | TGU10 | TCD10 | TOD10 |
| S11 | UPSHIFT (S11 → S12) | TGD11 | TCU11 | TOU11 |
| S12 | DOWNSHIFT (S12 ← S11) | TGU11 | TCD11 | TOD11 |

FIG. 14

| CURRENT SHIFT POSITION | SHIFT OPERATION SIGNAL | DISTANCE DS [MM] | CORRECTION VALUE DC [MM] | ORIGINAL DISTANCE DO [MM] |
|---|---|---|---|---|
| S1 | UPSHIFT (S1 → S2) | DRU1 | DCU1 | DOU1 |
| S2 | DOWNSHIFT (S1 ← S2) | DRD1 | DCD1 | DOD1 |
| S2 | UPSHIFT (S2 → S3) | DRU2 | DCU2 | DOU2 |
| S3 | DOWNSHIFT (S2 ← S3) | DRD2 | DCD2 | DOD2 |
| S3 | UPSHIFT (S3 → S4) | DRU3 | DCU3 | DOU3 |
| S4 | DOWNSHIFT (S3 ← S4) | DRU3 | DCD3 | DOD3 |
| S4 | UPSHIFT (S4 → S5) | DRD4 | DCU4 | DOU4 |
| S5 | DOWNSHIFT (S4 ← S5) | DRU4 | DCD4 | DOD4 |
| S5 | UPSHIFT (S5 → S6) | DRD5 | DCU5 | DOU5 |
| S6 | DOWNSHIFT (S5 ← S6) | DRU5 | DCD5 | DOD5 |
| S6 | UPSHIFT (S6 → S7) | DRU6 | DCU6 | DOU6 |
| S7 | DOWNSHIFT (S6 ← S7) | DRD6 | DCD6 | DOD6 |
| S7 | UPSHIFT (S7 → S8) | DRU7 | DCU7 | DOU7 |
| S8 | DOWNSHIFT (S7 ← S8) | DRD7 | DCD7 | DOD7 |
| S8 | UPSHIFT (S8 → S9) | DRU8 | DCU8 | DOU8 |
| S9 | DOWNSHIFT (S8 ← S9) | DRU8 | DCD8 | DOD8 |
| S9 | UPSHIFT (S9 → S10) | DRD9 | DCU9 | DOU9 |
| S10 | DOWNSHIFT (S9 ← S10) | DRU9 | DCD9 | DOD9 |
| S10 | UPSHIFT (S10 → S11) | DRD10 | DCU10 | DOU10 |
| S11 | DOWNSHIFT (S10 ← S11) | DRU10 | DCD10 | DOD10 |
| S11 | UPSHIFT (S11 → S12) | DRD11 | DCU11 | DOU11 |
| S12 | DOWNSHIFT (S12 ← S11) | DRU11 | DCD11 | DOD11 |

*FIG. 17*

SHIFTING CONTROL APPARATUS FOR HUMAN POWERED VEHICLE

BACKGROUND OF THE INVENTION

Field of the Invention

The present invention relates to a shifting control apparatus for a human powered vehicle.

Discussion of the Background

U.S. Patent Application Publication No. 2016/0096589 describes an apparatus to control a shifting device.

SUMMARY OF THE INVENTION

In accordance with a first aspect of the present invention, a shifting control apparatus for a human powered vehicle comprises a position sensor and a transmission controller. The position sensor is configured to sense a rotational position of a plurality of sprockets relative to a rotational reference position. The transmission controller is configured to control a derailleur to move a chain guide of the derailleur relative to the plurality of sprockets in a shifting operation. The transmission controller is configured to change at least one of a speed relating to a movement of the chain guide, a start timing relating to the movement of the chain guide, and a distance relating to the movement of the chain guide based on a target shifting-operation position of the plurality of sprockets, and the rotational position sensed as an actual shifting-operation position by the position sensor at an actual timing of the shifting operation. The target shifting-operation position is defined as a rotational position of the plurality of sprockets relative to the rotational reference position at a preferable timing of the shifting operation.

With the shifting control apparatus according to the first aspect, it is possible to improve robustness against change in a shifting-operation position caused by factors such as wear of the plurality of sprockets and/or a bicycle chain by using the actual shifting-operation position and the target shifting-operation position.

In accordance with a second aspect of the present invention, the shifting control apparatus according to the first aspect is configured so that the transmission controller is configured to calculate a positional difference between the target shifting-operation position and the actual shifting-operation position.

With the shifting control apparatus according to the second aspect, it is possible to identify the positional difference between the target shifting-operation position and the actual shifting-operation position.

In accordance with a third aspect of the present invention, the shifting control apparatus according to the second aspect is configured so that the transmission controller is configured to change the at least one of the speed, the start timing, and the distance relating to the movement of the chain guide based on the positional difference.

With the shifting control apparatus according to the third aspect, it is possible to further improve robustness against change in a shifting-operation position caused by factors such as wear of the plurality of sprockets and/or a bicycle chain by using the actual shifting-operation position and the positional difference.

In accordance with a fourth aspect of the present invention, the shifting control apparatus according to the third aspect is configured so that the transmission controller is configured to increase the speed relating to the movement of the chain guide in one of a first case where the positional difference indicates that the actual shifting-operation position is offset from the target shifting-operation position in a driving rotational direction of the plurality of sprockets and a second case where the positional difference indicates that the actual shifting-operation position is offset from the target shifting-operation position in a reverse rotational direction opposite to the driving rotational direction. The transmission controller is configured to decrease the speed relating to the movement of the chain guide in the other of the first case and the second case.

With the shifting control apparatus according to the fourth aspect, it is possible to further improve robustness against change in a shifting-operation position caused by factors such as wear of the plurality of sprockets and/or a bicycle chain by using the actual shifting-operation position and by changing the speed.

In accordance with a fifth aspect of the present invention, the shifting control apparatus according to the third aspect is configured so that the transmission controller is configured to advance the start timing relating to the movement of the chain guide in one of a first case where the positional difference indicates that the actual shifting-operation position is offset from the target shifting-operation position in a driving rotational direction of the plurality of sprockets and a second case where the positional difference indicates that the actual shifting-operation position is offset from the target shifting-operation position in a reverse rotational direction opposite to the driving rotational direction. The transmission controller is configured to delay the start timing relating to the movement of the chain guide in the other of the first case and the second case.

With the shifting control apparatus according to the fifth aspect, it is possible to further improve robustness against change in a shifting-operation position caused by factors such as wear of the plurality of sprockets and/or a bicycle chain by using the actual shifting-operation position and by changing the start timing.

In accordance with a sixth aspect of the present invention, the shifting control apparatus according to the third aspect is configured so that the transmission controller is configured to shorten the distance relating to the movement of the chain guide in one of a first case where the positional difference indicates that the actual shifting-operation position is offset from the target shifting-operation position in a driving rotational direction of the plurality of sprockets and a second case where the positional difference indicates that the actual shifting-operation position is offset from the target shifting-operation position in a reverse rotational direction opposite to the driving rotational direction. The transmission controller is configured to lengthen the distance relating to the movement of the chain guide in the other of the first case and the second case.

With the shifting control apparatus according to the sixth aspect, it is possible to further improve robustness against change in a shifting-operation position caused by factors such as wear of the plurality of sprockets and/or a bicycle chain by using the actual shifting-operation position and by changing the distance.

In accordance with a seventh aspect of the present invention, the shifting control apparatus according to any one of the first to sixth aspects is configured so that one of the position sensor and the transmission controller is configured to calculate a rotational speed of the plurality of sprockets based on the rotational position sensed by the position sensor. The transmission controller is configured to determine the actual timing of the shifting operation based on change in the rotational speed calculated by the one of the position sensor and the transmission controller.

With the shifting control apparatus according to the seventh aspect, it is possible to determine the actual timing of the shifting operation by using the change in the rotational speed.

In accordance with an eighth aspect of the present invention, the shifting control apparatus according to any one of the first to sixth aspects further comprises a state sensor configured to sense a rotating state of a front sprocket. The transmission controller is configured to determine the actual timing of the shifting operation based on the rotating state sensed by the state sensor.

With the shifting control apparatus according to the eighth aspect, it is possible to determine the actual timing of the shifting operation by using the state sensor.

In accordance with a ninth aspect of the present invention, the shifting control apparatus according to any one of the first to sixth aspects further comprises a shock sensor configured to sense a shock during the shifting-operation. The transmission controller is configured to determine the actual timing of the shifting operation based on the shock sensed by the shock sensor.

With the shifting control apparatus according to the ninth aspect, it is possible to determine the actual timing of the shifting operation by using the shock sensor.

In accordance with a tenth aspect of the present invention, the shifting control apparatus according to any one of the first to ninth aspects is configured so that a total number of the plurality of sprockets is equal to or larger than 9.

With the shifting control apparatus according to the tenth aspect, it is possible to apply the shifting control apparatus to a lightweight multiple sprocket which has a wide gear range and which facilitates the shifting operation.

In accordance with an eleventh aspect of the present invention, the shifting control apparatus according to any one of the first to tenth aspects is configured so that the plurality of sprockets includes a largest sprocket and a smallest sprocket. A tooth-number difference between a total number of teeth of the smallest sprocket and a total number of teeth of the largest sprocket is equal to or larger than 25.

With the shifting control apparatus according to the eleventh aspect, it is possible to apply the shifting control apparatus to a lightweight multiple sprocket which has a wide gear range and which facilitates the shifting operation.

In accordance with a twelfth aspect of the present invention, the shifting control apparatus according to any one of the first to eleventh aspects is configured so that the plurality of sprockets includes a largest sprocket and a smallest sprocket. A tooth-number difference between a total number of teeth of the smallest sprocket and a total number of teeth of the largest sprocket is equal to or larger than 35.

With the shifting control apparatus according to the twelfth aspect, it is possible to apply the shifting control apparatus to a lightweight multiple sprocket which has a wide gear range and which facilitates the shifting operation.

In accordance with a thirteenth aspect of the present invention, the shifting control apparatus according to any one of the first to twelfth aspects is configured so that the plurality of sprockets includes a largest sprocket. A total number of teeth of the largest sprocket is equal to or larger than 44.

With the shifting control apparatus according to the thirteenth aspect, it is possible to apply the shifting control apparatus to a lightweight multiple sprocket which has a wider gear range and which facilitates the shifting operation.

In accordance with a fourteenth aspect of the present invention, the shifting control apparatus according to any one of the first to thirteenth aspects is configured so that the plurality of sprockets includes a smallest sprocket. A total number of teeth of the smallest sprocket is equal to or smaller than 10.

With the shifting control apparatus according to the fourteenth aspect, it is possible to apply the shifting control apparatus to a lightweight multiple sprocket which has a wider gear range and which facilitates the shifting operation.

In accordance with a fifteenth aspect of the present invention, the shifting control apparatus according to any one of the first to fourteenth aspects is configured so that the derailleur includes a rear derailleur.

With the shifting control apparatus according to the fifteenth aspect, it is possible to apply the shifting control apparatus to the rear derailleur.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 9 shows an example of a list including target shifting-operation positions stored in the shifting control apparatus illustrated in FIG. 8.

FIG. 10 shows an example of a list including speeds stored in the shifting control apparatus illustrated in FIG. 8.

FIG. 14 shows an example of a list including waiting times stored in the shifting control apparatus illustrated in FIG. 13.

FIG. 17 shows an example of a list including distances stored in the shifting control apparatus illustrated in FIG. 16.

DESCRIPTION OF THE EMBODIMENTS

Figure 1:
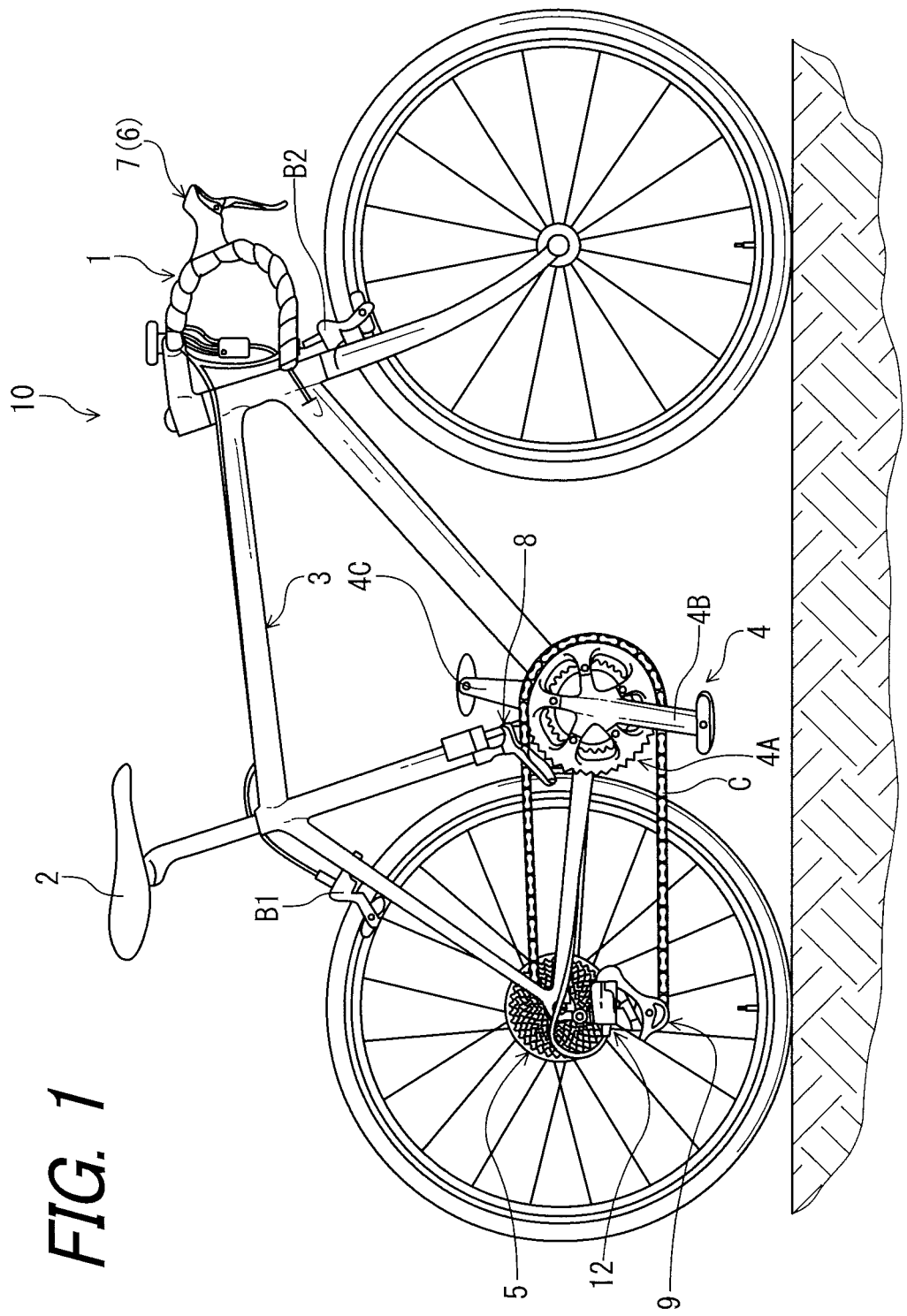
FIG. 1 is a side elevational view of a bicycle provided with a shifting control apparatus in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle 10 as an example of a human powered vehicle is illustrated that is equipped with a shifting control apparatus 12 in accordance with a first embodiment. The human powered vehicle is a vehicle to travel with a motive power including at least a human power of a rider who rides the human powered vehicle. The human powered vehicle has an arbitrary number of wheels. For example, the human powered vehicle has either one, two, three, four, or five or more wheels. In this embodiment, the human powered vehicle has a smaller size than that of a four-wheeled automobile, but the human powered vehicle can have an arbitrary size. For example, the human powered vehicle can be larger than the four-wheeled automobile. The human powered vehicles include the bicycle 10, a tricycle, and a kick scooter. While the bicycle 10 is illustrated as a road bike, the shifting control apparatus 12 can be applied to mountain bikes or any type of bicycle.

As seen in FIG. 1, the bicycle 10 includes a handlebar 1, a saddle 2, a bicycle frame 3, a crank assembly 4, a rear multiple sprocket 5, a front operating device 6, a rear operating device 7, a derailleur 8, and a derailleur 9. The crank assembly 4 includes a front sprocket 4A, a right crank arm 4B, and a left crank arm 4C. A bicycle chain C engages with the front sprocket 4A and the rear multiple sprocket 5. The derailleur 8 is configured to shift the bicycle chain C between a plurality of front gear positions in response to operation of the front operating device 6. The derailleur 9 is configured to shift the bicycle chain C between a plurality of rear gear positions in response to operation of the rear operating device 7. The front operating device 6 is integrated in a left-side operating device via which a user operates a rear braking device B1. The rear operating device 7 is integrated in a right-side operating device via which a user operates a front braking device B2. The derailleur 9 includes a rear derailleur. However, the location of the derailleur 9 is not limited to this embodiment.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on the saddle 2 of the bicycle 10 with facing the handlebar 1. Accordingly, these terms, as utilized to describe bicycle components, should be interpreted relative to the bicycle 10 equipped with the bicycle components as used in an upright riding position on a horizontal surface.

The shifting control apparatus 12 is wirelessly connected to the front operating device 6, the rear operating device 7, the derailleur 8, and the derailleur 9. However, the shifting control apparatus 12 can be connected to the front operating device 6, the rear operating device 7, the derailleur 8, and the derailleur 9 with other communication technology such as power line communications. In this embodiment, the shifting control apparatus 12 is electrically mounted to the derailleur 9. However, the shifting control apparatus 12 can be provided at other locations.

Figure 2:
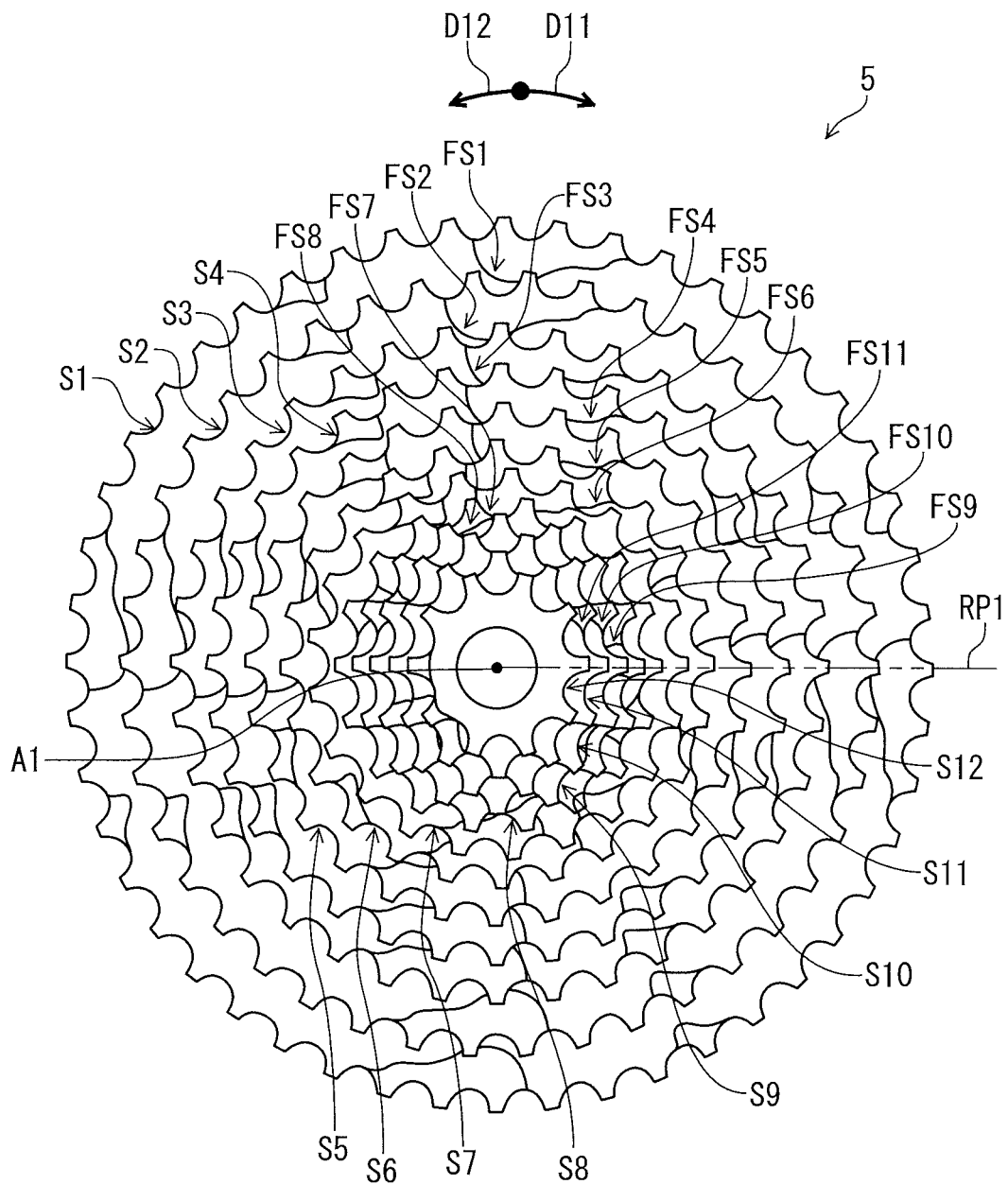
FIG. 2 is a side elevational view of a multiple sprocket of the bicycle illustrated in FIG. 1.

As seen in FIG. 2, the rear multiple sprocket 5 has a rotational center axis A1 and is rotatable about the rotational center axis A1 in a driving rotational direction D11 during pedaling. The rear multiple sprocket 5 includes sprockets S1 to S12. The sprocket S1 has a largest outer diameter in the rear multiple sprocket 5. The sprocket S12 has a smallest outer diameter in the rear multiple sprocket 5. Thus, the sprocket S1 can also be referred to as a largest sprocket S1. The sprocket S12 can also be referred to as a smallest sprocket S12. Namely, the plurality of sprockets S1 to S12 includes the largest sprocket S1 and the smallest sprocket S12.

A total number of the plurality of sprockets S1 to S12 is equal to or larger than 9. In this embodiment, the total number of the plurality of sprockets S1 to S12 is 12. However, the total number of the plurality of sprockets is not limited to this embodiment.

A tooth-number difference between a total number of teeth of the smallest sprocket S12 and a total number of teeth of the largest sprocket S1 is equal to or larger than 25. The tooth-number difference between the total number of teeth of the smallest sprocket S12 and the total number of teeth of the largest sprocket S1 is equal to or larger than 35.

In this embodiment, the total number of teeth of the largest sprocket S1 is equal to or larger than 44. The total number of teeth of the largest sprocket S1 is 48. The total number of teeth of the smallest sprocket S12 is equal to or smaller than 10. The total number of teeth of the smallest sprocket S12 is 10. The tooth-number difference between the total number of teeth of the smallest sprocket S12 and the total number of teeth of the largest sprocket S1 is 38. However, the tooth-number difference is not limited to this embodiment. The total number of teeth of the largest sprocket S1 is not limited to this embodiment. The total number of teeth of the smallest sprocket S12 is not limited to this embodiment.

Figure 3:
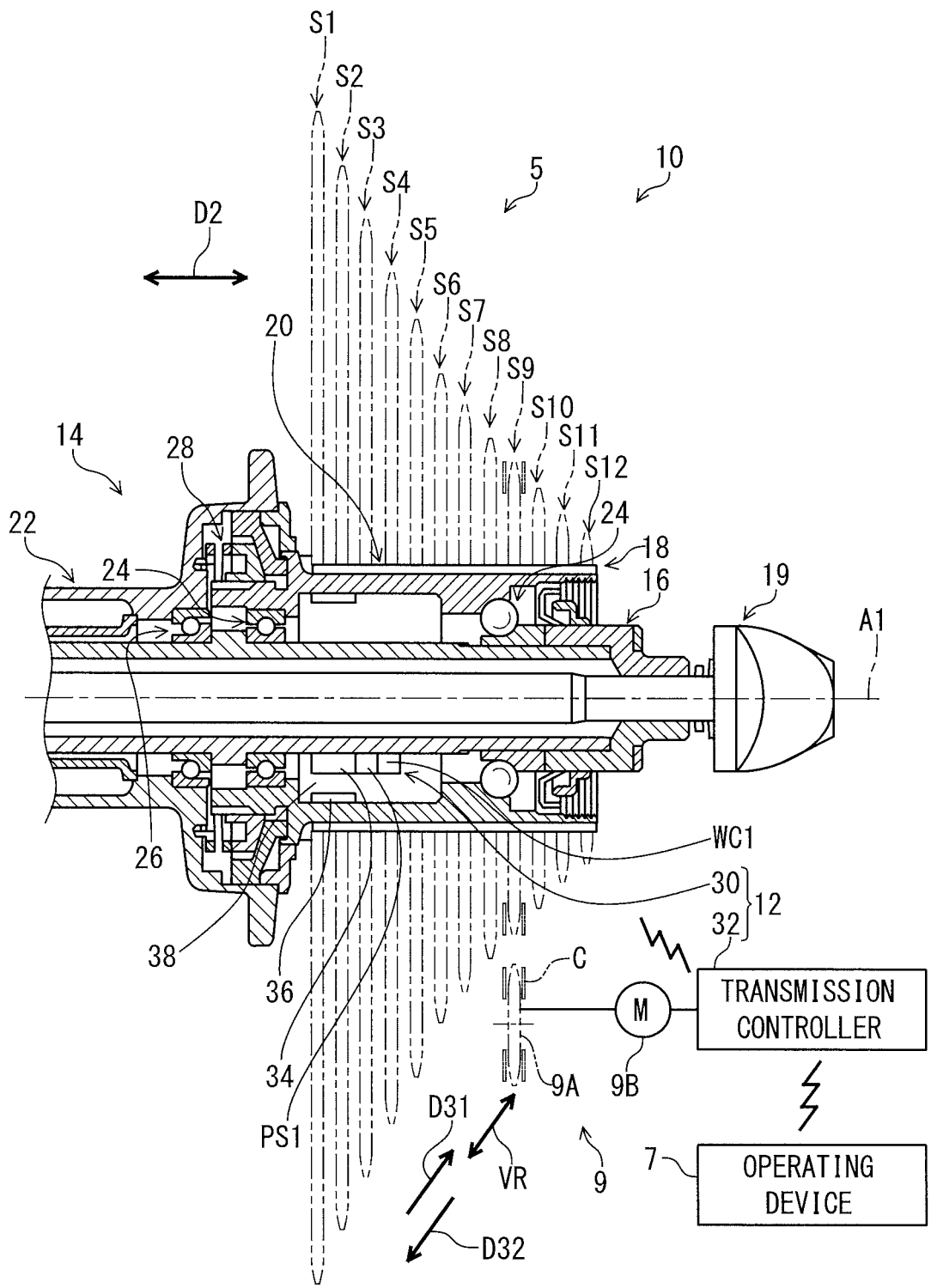
FIG. 3 is a half cross-sectional view of a bicycle hub assembly of the bicycle illustrated in FIG. 1.

As seen in FIG. 3, the sprockets S1 to S12 are arranged in an axial direction D2 parallel to the rotational center axis A1. The bicycle 10 includes a bicycle hub assembly 14. The sprockets S1 to S12 are mounted on the bicycle hub assembly 14, The bicycle hub assembly 14 includes an axle member 16 and a housing member 18. The axle member 16 is configured to be mounted to the bicycle frame 3 with a wheel securing device 19. The housing member 18 is rotatably mounted on the axle member 16 about the rotational center axis A1. The rear multiple sprocket 5 is mounted on the housing member 18. The housing member 18 includes an external spline 20 configured to engage with an internal spline of the rear multiple sprocket 5.

The bicycle hub assembly 14 further includes a hub shell 22, first bearing assemblies 24, second bearing assemblies 26, and a ratchet structure 28. In FIG. 3, one of the second bearing assemblies 26 is illustrated. The hub shell 22 is rotatably mounted on the axle member 16 about the rotational center axis A1. A rim (not shown) is connected to the hub shell 22 with spokes (not shown). The first bearing assemblies 24 rotatably support the housing member 18 on the axle member 16. The second bearing assemblies 26 rotatably support the hub shell 22 on the axle member 16.

As seen in FIG. 3, the ratchet structure 28 serves as a one-way clutch to transmit a driving force from the housing member 18 to the hub shell 22. More specifically, the ratchet structure 28 is configured to prevent the housing member 18 from rotating relative to the hub shell 22 in the driving rotational direction D11 (FIG. 2). The ratchet structure 28 is further configured to allow the housing member 18 to rotate relative to the hub shell 22 in a reverse rotational direction D12 (FIG. 2) opposite to the driving rotational direction D11.

The rear multiple sprocket 5, the housing member 18, and the hub shell 22 are configured to integrally rotate relative to the axle member 16 in the driving rotational direction D11 (FIG. 2) during pedaling. The rear multiple sprocket 5 and the housing member 18 are configured to relatively rotate in the reverse rotational direction D12 (FIG. 2) with respect to the axle member 16 and the hub shell 22 not to transmit force from the hub shell 22 to the rear multiple sprocket 5 during coasting. Since the bicycle hub assembly 14 includes structures known in the bicycle field, they will not be described and/or illustrated in detail here for the sake of brevity.

As seen in FIG. 3, the derailleur 9 includes a chain guide 9A and a guide actuator 9B. The chain guide 9A is engageable with the bicycle chain C to shift the bicycle chain C between the sprockets S1 to S12. The guide actuator 9B is coupled to the chain guide 9A to move the chain guide 9A relative to the bicycle hub assembly 14. Since the derailleur 9 includes structures known in the bicycle field, they will not be described and/or illustrated in detail here for the sake of brevity.

Upshifting occurs when the derailleur 9 shifts the bicycle chain C from a larger sprocket to a neighboring smaller sprocket in an upshifting direction D31. Downshifting occurs when the derailleur 9 shifts the bicycle chain C from a small sprocket to a neighboring larger sprocket in a downshifting direction D32.

As seen in FIG. 2, the sprockets S1 to S11 have a shifting facilitation structure configured to facilitate a shifting operation in which the derailleur 9 shifts the bicycle chain C from a sprocket to a neighboring sprocket. As seen in FIG. 3, the sprockets S1 to S11 respectively have the shifting facilitation structures FS1 to FS11.

Figure 4:
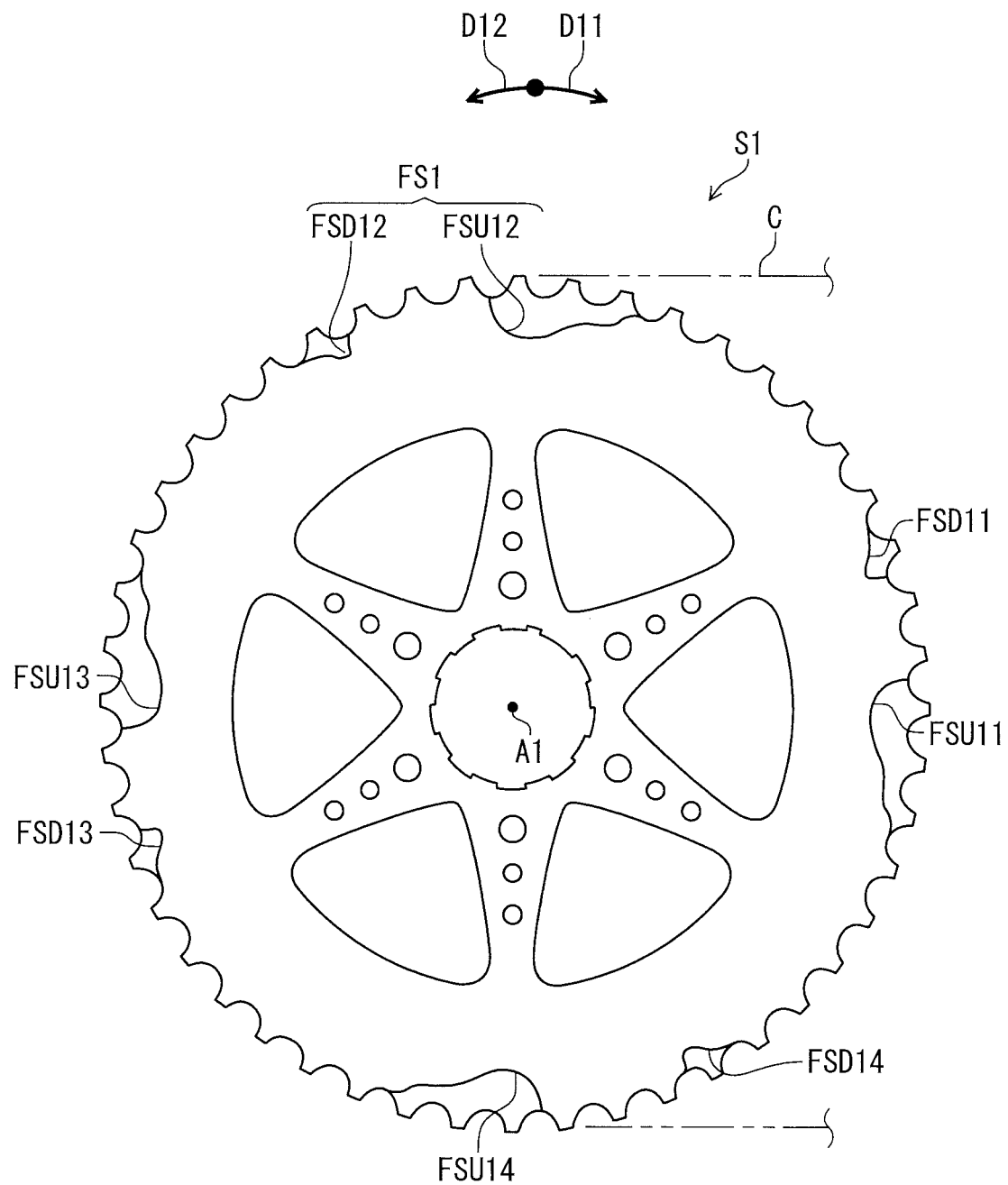
FIG. 4 is a side elevational view of a sprocket of the sprocket assembly illustrated in FIG. 2.

As seen in FIG. 4, the shifting facilitation structure FS1 of the sprocket S1 includes at least one shifting facilitation recess. In this embodiment, the shifting facilitation structure FS1 includes upshifting facilitation recesses FSU11 to FSU14 and downshifting facilitation recesses FSD11 to FSD14 as the at least one shifting facilitation recess. The upshifting facilitation recesses FSU11 to FSU14 are configured to facilitate an upshifting operation in which the derailleur 9 shifts the bicycle chain C from the sprocket S1 to the sprocket S2 (FIG. 3). The downshifting facilitation recesses FSD11 to FSD14 are configured to facilitate a downshifting operation in which the derailleur 9 shifts the bicycle chain C from the sprocket S2 (FIG. 3) to the sprocket S1. More specifically, the upshifting facilitation recesses FSU11 to FSU14 are configured to reduce interference between the sprocket S1 and the bicycle chain C in the upshifting operation. The downshifting facilitation recesses FSD11 to FSD14 are configured to reduce interference between the sprocket S1 and the bicycle chain C in the downshifting operation.

Figure 5:
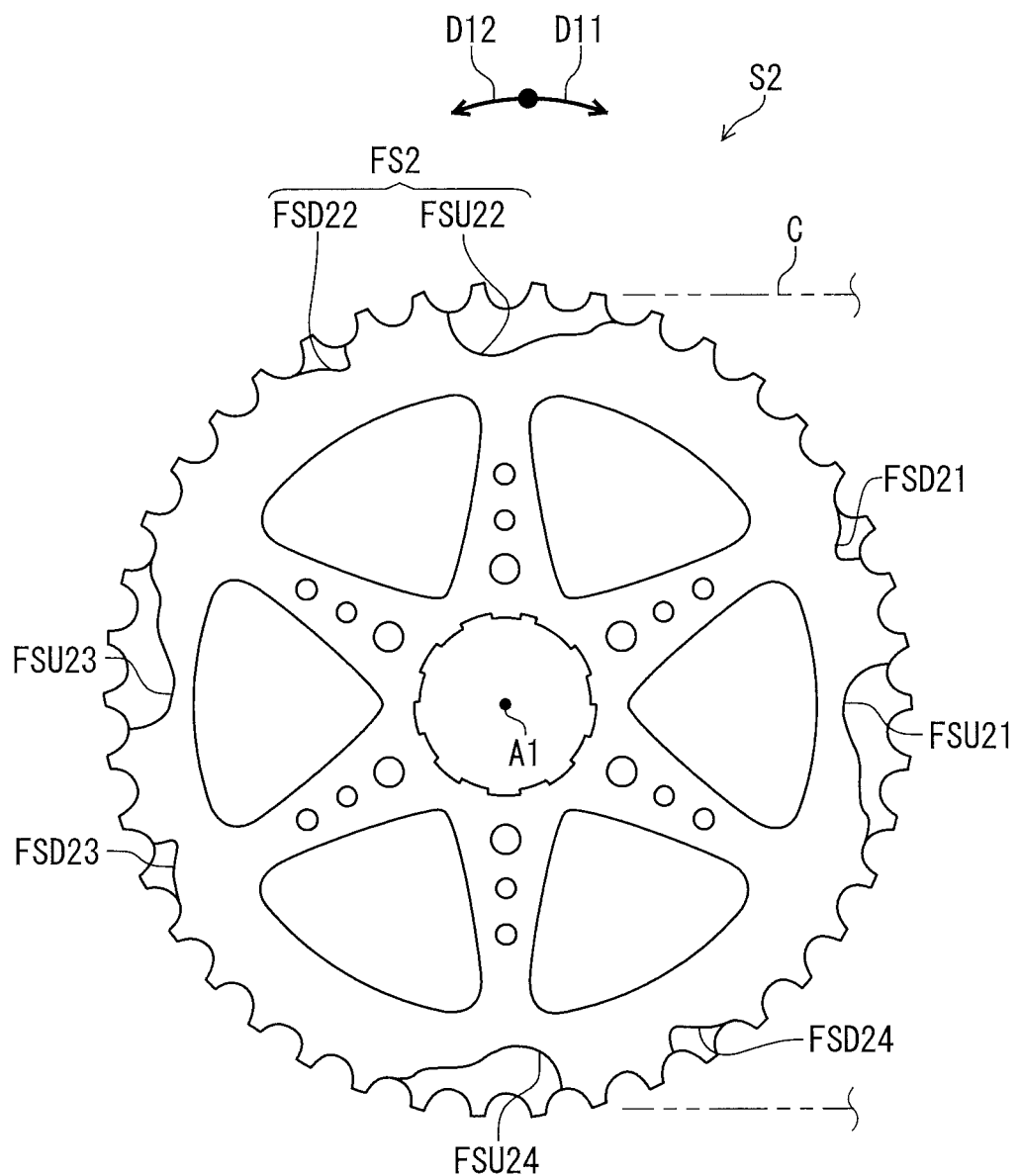
FIG. 5 is a side elevational view of a sprocket of the sprocket assembly illustrated in FIG. 2.

As seen in FIG. 5, the shifting facilitation structure FS2 of the sprocket S2 includes at least one shifting facilitation recess. In this embodiment, the shifting facilitation structure FS2 includes upshifting facilitation recesses FSU21 to FSU24 and downshifting facilitation recesses FSD21 to FSD24 as the at least one shifting facilitation recess. The upshifting facilitation recesses FSU21 to FSU24 are configured to facilitate an upshifting operation in which the derailleur 9 shifts the bicycle chain C from the sprocket S2 to the sprocket S3 (FIG. 3). The downshifting facilitation recesses FSD21 to FSD24 are configured to facilitate a downshifting operation in which the derailleur 9 shifts the bicycle chain C from the sprocket S3 (FIG. 3) to the sprocket S2. More specifically, the upshifting facilitation recesses FSU21 to FSU24 are configured to reduce interference between the sprocket S2 and the bicycle chain C in the upshifting operation. The downshifting facilitation recesses FSD21 to FSD24 are configured to reduce interference between the sprocket S2 and the bicycle chain C in the downshifting operation.

Figure 6:
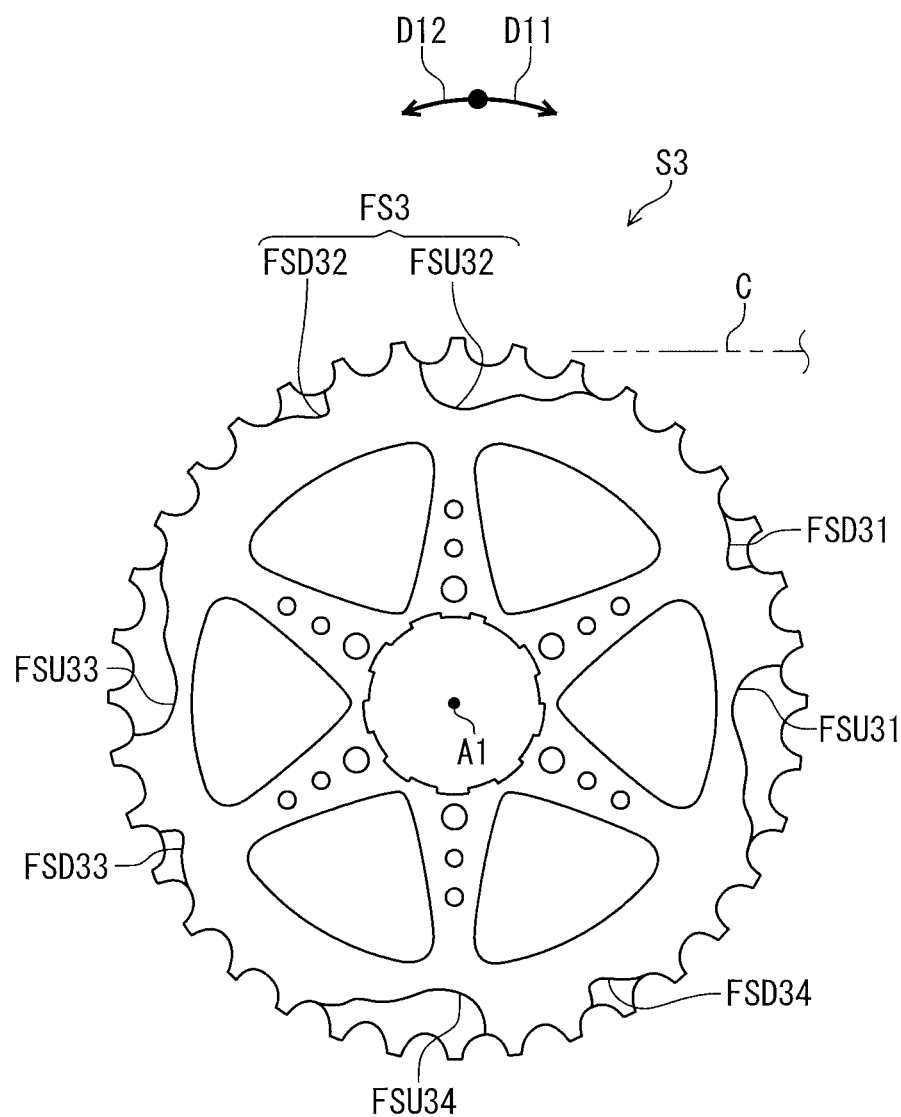
FIG. 6 is a side elevational view of a sprocket of the sprocket assembly illustrated in FIG. 2.

As seen in FIG. 6, the shifting facilitation structure FS3 of the sprocket S3 includes at least one shifting facilitation recess. In this embodiment, the shifting facilitation structure FS3 includes upshifting facilitation recesses FSU31 to FSU34 and downshifting facilitation recesses FSD31 to FSD34 as the at least one shifting facilitation recess. The upshifting facilitation recesses FSU31 to FSU34 are configured to facilitate an upshifting operation in which the derailleur 9 shifts the bicycle chain C from the sprocket S3 to the sprocket S4 (FIG. 3). The downshifting facilitation recesses FSD31 to FSD34 are configured to facilitate a downshifting operation in which the derailleur 9 shifts the bicycle chain C from the sprocket S4 (FIG. 3) to the sprocket S3. More specifically, the upshifting facilitation recesses FSU31 to FSU34 are configured to reduce interference between the sprocket S3 and the bicycle chain C in the upshifting operation. The downshifting facilitation recesses FSD31 to FSD34 are configured to reduce interference between the sprocket S3 and the bicycle chain C in the downshifting operation.

Each of the shifting facilitation structures FS1 to FS3 can include at least one shifting facilitation tooth and/or at least one shifting facilitation gap instead of or in addition to the at least one shifting facilitation recess. The shifting facilitation gap is free from an additional tooth configured to engage with the bicycle chain C.

As well as the shifting facilitation structures FS1 to FS3 of the sprockets S1 to S3, each of the shifting facilitation structures FS4 to FS11 (FIG. 2) includes at least one shifting facilitation recess. Since they have substantially the same structure as the shifting facilitation structures FS1 to FS3, they will not be described and/or illustrated in detail here for the sake of brevity.

Figure 7:
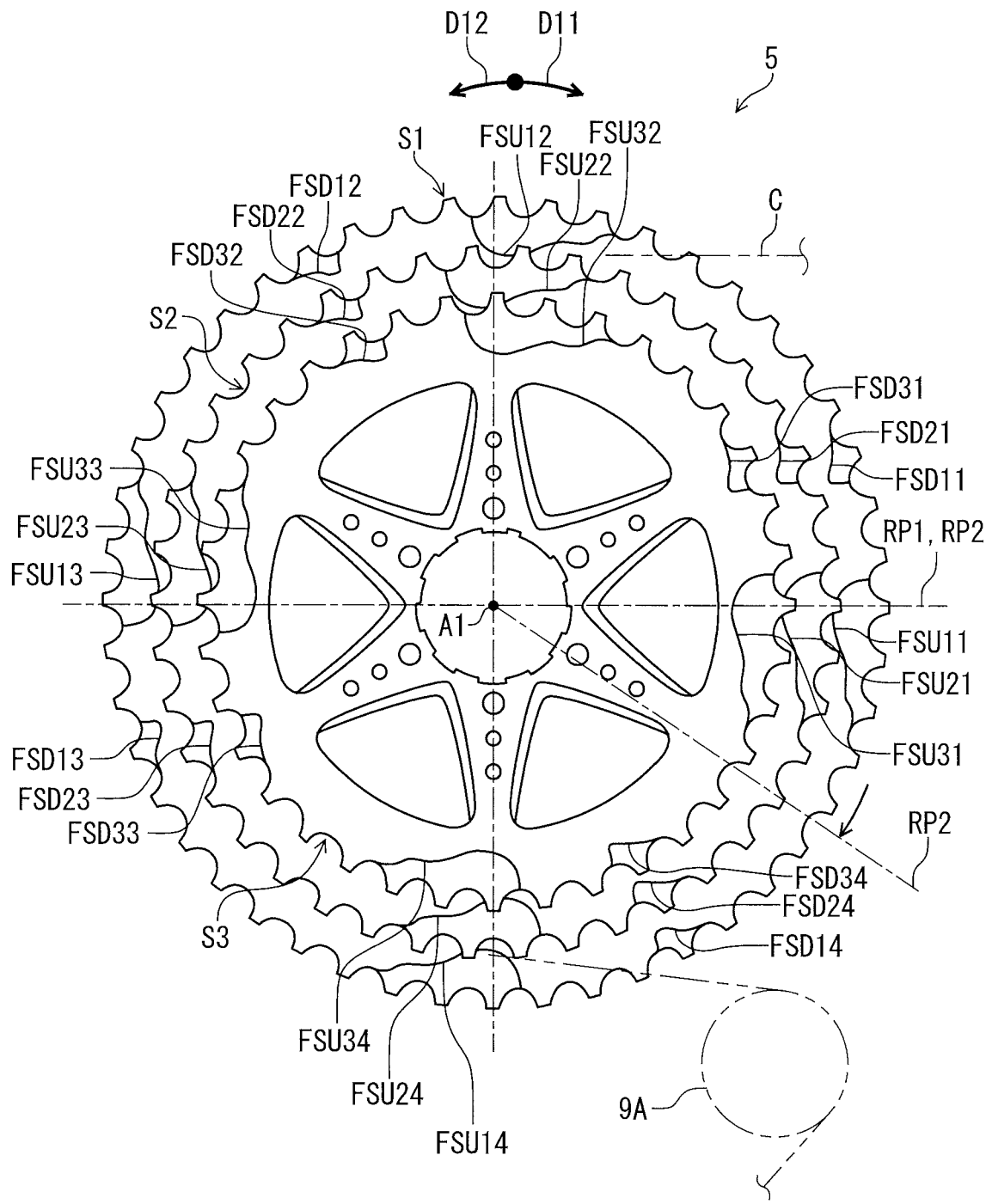
FIG. 7 is a side elevational view of the sprockets of the sprocket assembly illustrated in FIG. 2.

In FIG. 7, the sprockets S4 to S12 are omitted from the rear multiple sprocket 5 for the purpose of illustration. Each of the upshifting facilitation recesses FSU21 to FSU24 has a preferable upshift timing (a preferable rotational position) at which the derailleur 9 shifts the bicycle chain C from the sprocket S2 to the sprocket S3. Similarly, each of the downshifting facilitation recesses FSD11 to FSD14 has a preferable downshift timing (a preferable rotational position) at which the derailleur 9 shifts the bicycle chain C from the sprocket S2 to the sprocket S1. The preferable upshift timing at which the derailleur 9 shifts the bicycle chain C from the sprocket S2 to the sprocket S3 is defined based on the upshifting facilitation recesses FSU21 to FSU24 of the sprocket S2. The preferable downshift timing at which the derailleur 9 shifts the bicycle chain C from the sprocket S2 to the sprocket S1 is defined based on the downshifting facilitation recesses FSD11 to FSD14 of the sprocket S1.

Shifting the bicycle chain C at the preferable upshift timing reduces shock caused by interference between the bicycle chain C and the sprocket S2 during upshifting. Shifting the bicycle chain C at the preferable downshift timing reduces shock caused by interference between the bicycle chain C and the sprocket S1 during downshifting. However, the wear of at least one of the plurality of sprockets S1 to S12 and the bicycle chain C can vary the preferable upshift timing and/or the preferable downshift timing.

To reduce influence of the wear of at least one of the plurality of sprockets S1 to S12 on the preferable shift timing, for example, the shifting control apparatus 12 is configured to change at least one of a speed relating to a movement of the chain guide 9A, a start timing relating to the movement of the chain guide 9A, and a distance relating to the movement of the chain guide 9A.

Figure 8:
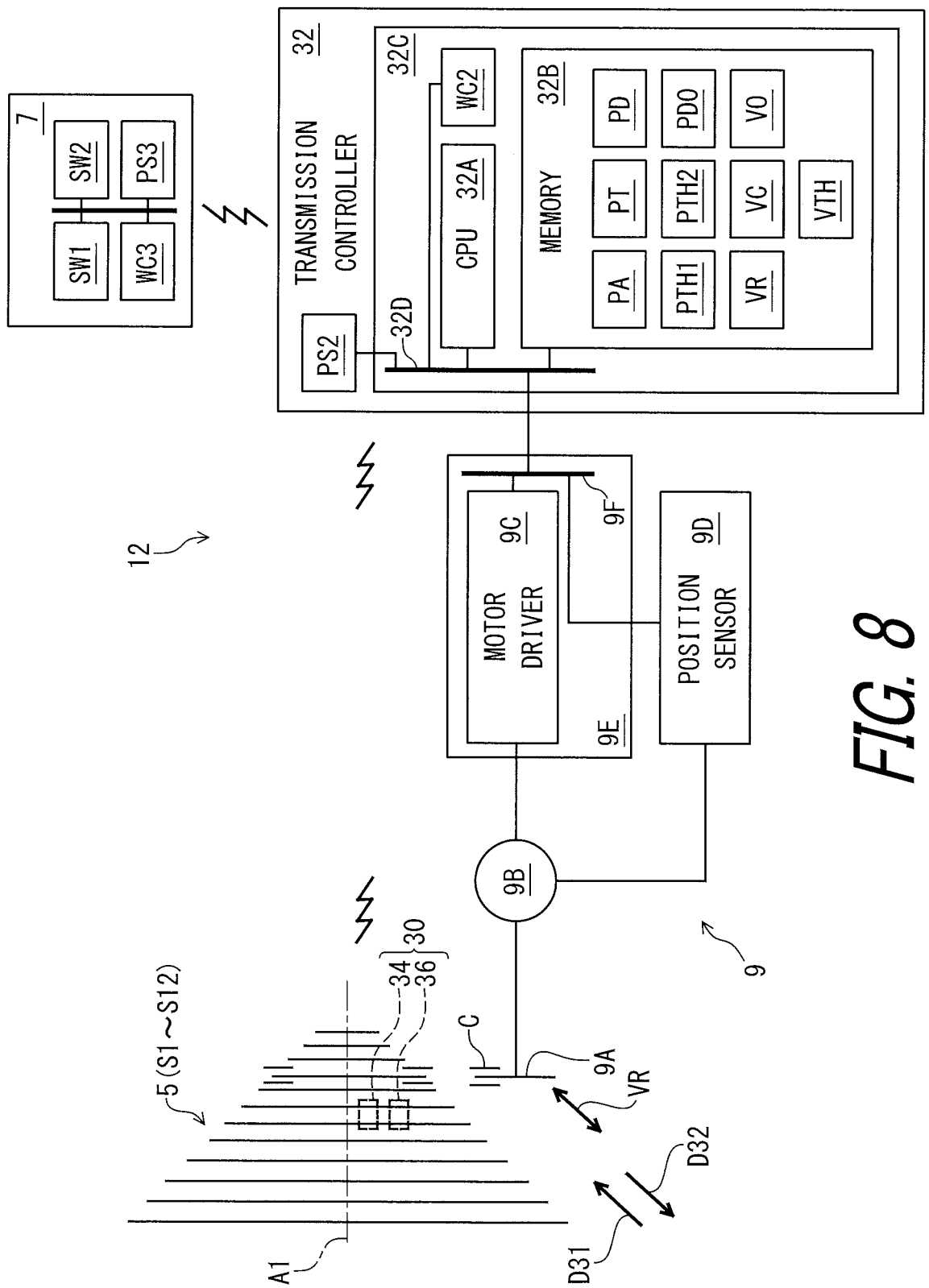
FIG. 8 is a schematic block diagram of the bicycle shifting control apparatus illustrated in FIG. 1.

As seen in FIG. 8, the shifting control apparatus 12 for the human powered vehicle comprises a position sensor 30 and a transmission controller 32. The position sensor 30 is configured to sense a rotational position of the plurality of sprockets S1 to S12 relative to a rotational reference position RP1 (FIG. 7). As seen in FIG. 2, the rotational reference position RP1 is defined relative to the bicycle frame 3 (FIG. 1). A circumferential reference position RP2 is defined on the plurality of sprockets S1 to S12. As seen in FIG. 8, the position sensor 30 is configured to sense an absolute rotational position of the plurality of sprockets S1 to S12 (an absolute rotational position of the circumferential reference position RP2 (FIG. 7)) relative to the rotational reference position RP1. However, the position sensor 30 can be configured to sense a relative rotational position of the plurality of sprockets S1 to S12. The transmission controller 32 is electrically connected to the derailleur 9 and the position sensor 30 to control the derailleur 9 based on the rotational position sensed by the position sensor 30.

As seen in FIG. 3, the position sensor 30 includes a sensor unit 34 and a sensing target 36. The sensor unit 34 is configured to sense an absolute rotational position of the sensing target 36. The position sensor 30 is provided between the axle member 16 and the housing member 18. The position sensor 30 is provided in a cavity 38 defined between the axle member 16 and the housing member 18. The sensor unit 34 is attached to the axle member 16. The sensing target 36 is attached to the housing member 18 to radially face the sensor unit 34. The sensing target 36 has an annular shape. The sensing target 36 has position information indicating an absolute rotational position of the rear multiple sprocket 5. Examples of the position information include an optical pattern and a magnetic pattern.

The position sensor 30 is configured to wirelessly and periodically transmit the absolute rotational position of the plurality of sprockets S1 to S12 to the transmission controller 32. In this embodiment, the position sensor 30 includes a wireless communicator WC1 and a power storage PS1. The wireless communicator WC1 is configured to wirelessly and periodically transmit the absolute rotational position sensed by the sensor unit 34 to the transmission controller 32. For example, the wireless communicator WC1 includes a signal transmitting circuit, a signal receiving circuit, and an antenna. The wireless communicator WC1 includes a configuration which has been known in the wireless technology field. Thus, it will not be described in detail here for the sake of brevity. The power storage PS1 is electrically connected to the sensor unit 34 and the wireless communicator WC1 to supply electric power to the sensor unit 34 and the wireless communicator WC1. Examples of the power storage PS1 include a battery.

The transmission controller 32 is configured to control the derailleur 9 to move the chain guide 9A of the derailleur 9 relative to the plurality of sprockets S1 to S12 in the shifting operation. The transmission controller 32 is electrically connected to the derailleur 9 to control the derailleur 9 to move the chain guide 9A of the derailleur 9 relative to the plurality of sprockets S1 to S12 in the shifting operation.

As seen in FIG. 8, the transmission controller 32 includes a central processing unit (CPU) 32A, a memory 32B, a circuit board 32C, and a bus 32D. The CPU 32A, the memory 32B, and the bus 32D are electrically mounted on the circuit board 32C and are electrically connected to an internal conductor of the circuit board 32C. The CPU 32A is electrically connected to the memory 32B with the circuit board 32C and the bus 32D to communicate with the memory 32B. The CPU 32A and the memory 32B are electrically connected to the derailleur 9 with the bus 32D and the circuit board 32C.

The memory 32B includes a read-only memory (ROM) and a random-access memory (RAM). For example, the ROM includes a non-transitory computer-readable storage medium, and the RAM includes a transitory computer-readable storage medium. However, the structure of the memory 32B is not limited to this embodiment. The memory 32B includes storage areas each having an address in the ROM and the RAM. The transmission controller 32 controls the memory 32B to store data in the storage areas of the memory 32B and reads data from the storage areas of the memory 32B.

At least one program is stored in the memory 32B (e.g., the ROM). The at least one program is read into the transmission controller 32, and thereby the configuration and/or algorithm of the transmission controller 32 is performed. Namely, the CPU 32A, the memory 32B, the circuit board 32C, and the bus 32D constitute control circuitry configured to control the derailleur 9 to move the chain guide 9A of the derailleur 9 relative to the plurality of sprockets S1 to S12 in the shifting operation. Thus, the transmission controller 32 can also be referred to as transmission control circuitry 12. Furthermore, the CPU 32A constitutes processing circuitry to process data for controlling the derailleur 9. Thus, the CPU 32A can also be referred to as processing circuitry 32A. Similarly, the memory 32B constitutes memory circuitry to store data received from other components. Thus, the memory 32B can also be referred to as memory circuitry 32B.

In this embodiment, the transmission controller 32 includes a wireless communicator WC2 and a power storage PS2. The wireless communicator WC2 is configured to wirelessly revive the absolute rotational position sensed by the sensor unit 34 from the position sensor 30. The wireless communicator WC2 is configured to wirelessly revive the operation signals from the rear operating device 7. For example, the wireless communicator WC2 includes a signal transmitting circuit, a signal receiving circuit, and an antenna. The wireless communicator WC2 includes a configuration which has been known in the wireless technology field. Thus, it will not be described in detail here for the sake of brevity. The power storage PS2 is electrically connected to the CPU 32A, the memory 32B, and the wireless communicator WC2 to supply electric power to the CPU 32A, the memory 32B, and the wireless communicator WC2. The power storage PS2 is electrically connected to the derailleur 9 to supply electric power to the derailleur 9. Examples of the power storage PS2 include a battery.

The derailleur 9 includes a motor driver 9C, a shift position sensor 9D, a circuit board 9E, and a bus 9F. The motor driver 9C, the shift position sensor 9D, and the bus 9F are electrically mounted on the circuit board 9E and are electrically connected to an internal conductor of the circuit board 9E. The bus 9F is electrically connected to the bus 32D. The motor driver 9C is electrically connected to the guide actuator 9B with the circuit board 9E and the bus 9F to control the guide actuator 9B based on commands and/or signals from the transmission controller 32. Examples of the guide actuator 9B include a direct-current (DC) motor and a stepper motor.

The shift position sensor 9D is configured to sense a current shift position (a current gear position) of the derailleur 9. More specifically, the shift position sensor 9D is configured to sense a current axial position of the chain guide 9A relative to the rear multiple sprocket 5. The motor driver 9C is electrically connected to the shift position sensor 9D with the circuit board 9E and the bus 9F to periodically receive the current shift position (the current axial position) sensed by the shift position sensor 9D.

Examples of the shift position sensor 9D include a potentiometer, an optical sensor, and a magnetic sensor. Examples of the optical sensor include a rotary encoder. Examples of the magnetic sensor include a sensor having a magnetic resistance element, and a hall sensor having a hall element.

The guide actuator 9B, the motor driver 9C, and the shift position sensor 9D constitute a servomotor. The transmission controller 32 is electrically connected to the shift position sensor 9D with the buses 32D and 9F to periodically receive the current shift position from the shift position sensor 9D. The transmission controller 32 is configured to determine the current shift position of the derailleur 9 based on the current position transmitted from the shift position sensor 9D. The transmission controller 32 is configured to store the current position of the chain guide 9A as the current shift position in the memory 32B.

As seen in FIG. 8, the rear operating device 7 is configured to generate a shift operation signal in response to a user input. The shift operation signal includes an upshift operation signal and a downshift operation signal. The rear operating device 7 includes a first electrical switch SW1 and a second electrical switch SW2. The first electrical switch SW1 is configured to receive a user upshift input. The second electrical switch SW2 is configured to receive a user downshift input. The rear operating device 7 is configured to generate the upshift operation signal in response to the user upshift input. The rear operating device 7 is configured to generate the downshift operation signal in response to the user downshift input.

In this embodiment, the rear operating device 7 includes a wireless communicator WC3 and a power storage PS3. The wireless communicator WC3 is configured to wirelessly transmit the shift operation signal to the transmission controller 32 in response to the user input. The wireless communicator WC3 is electrically connected to the first electrical switch SW1 to wirelessly transmit the upshift operation signal to the transmission controller 32 in response to the user upshift input received by the first electrical switch SW1. The wireless communicator WC3 is electrically connected to the second electrical switch SW2 to wirelessly transmit the downshift operation signal to the transmission controller 32 in response to the user downshift input received by the second electrical switch SW2. For example, the wireless communicator WC3 includes a signal transmitting circuit, a signal receiving circuit, and an antenna. The wireless communicator WC3 includes a configuration which has been known in the wireless technology field. Thus, it will not be described in detail here for the sake of brevity. The power storage PS3 is electrically connected to the first electrical switch SW1, the second electrical switch SW2, and the wireless communicator WC3 to supply electric power to the first electrical switch SW1, the second electrical switch SW2, and the wireless communicator WC3. Examples of the power storage PS3 include a battery.

To adjust an actual timing of the shifting operation to a preferable timing of the shifting operation, the transmission controller 32 is configured to change at least one of a speed relating to a movement of the chain guide 9A, a start timing relating to the movement of the chain guide 9A, and a distance relating to the movement of the chain guide 9A based on a target shifting-operation position PT of the plurality of sprockets S1 to S12 and the rotational position sensed as an actual shifting-operation position PA by the position sensor 30 at the actual timing of the shifting operation. In this embodiment, the transmission controller 32 is configured to change the speed VR relating to the movement of the chain guide 9A based on the target shifting-operation position PT of the plurality of sprockets S1 to S12 and the rotational position sensed the actual shifting-operation position PA by the position sensor 30 at the actual timing of the shifting operation. However, the transmission controller 32 can be configured to change at least one of the speed, the start timing, and the distance based on the target shifting-operation position PT and the actual shifting-operation position PA.

The target shifting-operation position PT is defined as a rotational position of the plurality of sprockets S1 to S12 relative to the rotational reference position RP1 at a preferable timing of the shifting operation. For example, the target shifting-operation position PT includes a target shifting-operation angle defined about the rotational center axis A1 of the plurality of sprockets S1 to S12. The actual shifting-operation position PA includes an actual shifting-operation angle defined about the rotational center axis A1 of the plurality of sprockets S1 to S12. The transmission controller 32 is configured to store the target shifting-operation position PT in the memory 32B. The transmission controller 32 is configured to temporarily store the actual shifting-operation position PA in the memory 32B when receiving the actual shifting-operation position PA from the position sensor 30.

In this embodiment, the transmission controller 32 is configured to calculate a positional difference PD between the target shifting-operation position PT and the actual shifting-operation position PA. The transmission controller 32 is configured to subtract the actual shifting-operation position PA from the target shifting-operation position PT to calculate the positional difference PD. The transmission controller 32 is configured to temporarily store the calculated positional difference PD in the memory 32B.

The transmission controller 32 is configured to change the at least one of the speed, the start timing, and the distance relating to the movement of the chain guide 9A based on the positional difference PD. The transmission controller 32 is configured to increase the speed VR relating to the movement of the chain guide 9A in one of a first case where the positional difference PD indicates that the actual shifting-operation position PA is offset from the target shifting-operation position PT in the driving rotational direction D11 (FIG. 2) of the plurality of sprockets S1 to S12 and a second case where the positional difference PD indicates that the actual shifting-operation position PA is offset from the target shifting-operation position PT in the reverse rotational direction D12 (FIG. 2) opposite to the driving rotational direction D11. The transmission controller 32 is configured to decrease the speed VR relating to the movement of the chain guide 9A in the other of the first case and the second case.

In this embodiment, the transmission controller 32 is configured to increase the speed VR relating to the movement of the chain guide 9A in the first case where the positional difference PD indicates that the actual shifting-operation position PA is offset from the target shifting-operation position PT in the driving rotational direction D11. The transmission controller 32 is configured to decrease the speed VR relating to the movement of the chain guide 9A in the second case where the positional difference PD indicates that the actual shifting-operation position PA is offset from the target shifting-operation position PT in the reverse rotational direction D12. However, the transmission controller 32 can be configured to increase the speed VR relating to the movement of the chain guide 9A in the second case. The transmission controller 32 can be configured to decrease the speed VR relating to the movement of the chain guide 9A in the first case.

To determine whether the actual shifting-operation position PA is offset from the target shifting-operation position PT, the transmission controller 32 is configured to compare the positional difference PD with an upper threshold value PTH1 and a lower threshold value PTH2 which are stored in the memory 32B. For example, the upper threshold value PTH1 is a positive number, and the lower threshold value PTH2 is a negative number. The transmission controller 32 is configured to determine whether the positional difference PD is within a range defined by the upper threshold value PTH1 and the lower threshold value PTH2. Specifically, the transmission controller 32 is configured to determine whether the positional difference PD is larger than the upper threshold value PTH1. The transmission controller 32 is configured to determine whether the positional difference PD is smaller than the lower threshold value PTH2. When the positional difference PD is larger than the upper threshold value PTH1 or smaller than the lower threshold value PTH2, the preferable upshift timing and/or the preferable downshift timing may vary due to the wear of at least one of the plurality of sprockets S1 to S12 and the bicycle chain C.

In this embodiment, the transmission controller 32 is configured to change the speed VR relating to the movement of the chain guide when the positional difference PD is larger than the upper threshold value PTH1 or smaller than the lower threshold value PTH2. Specifically, the transmission controller 32 is configured to add or subtract a correction value VC to or from the speed VR to calculate the updated speed VR when the positional difference PD is larger than the upper threshold value PTH1. The transmission controller 32 is configured to subtract or add the correction value VC from or to the speed VR to calculate the updated speed VR when the positional difference PD is larger than the upper threshold value PTH1. The transmission controller 32 is configured to store the updated speed VR in the memory 32B to use the updated speed VR in the same shifting operation occurring at the same shift position.

To evaluate the previous change of the speed VR, the transmission controller 32 is configured to compare the current positional difference PD with the previous positional difference PD calculated in the same shifting operation occurring at the same shift position. The transmission controller 32 is configured to determine whether the current positional difference PD is equal to or smaller than the previous positional difference PD when concluding that the current positional difference PD is larger than the upper threshold value PTH1. The transmission controller 32 is configured to add the correction value VC to the speed VR to calculate the updated speed VR when the current positional difference PD is equal to or smaller than the previous positional difference PD. The transmission controller 32 is configured to subtract the correction value VC from the speed VR to calculate the updated speed VR when the current positional difference PD is larger than the previous positional difference PD.

The transmission controller 32 is configured to determine whether the current positional difference PD is equal to or larger than the previous positional difference PD when concluding that the current positional difference PD is smaller than the lower threshold value PTH2. The transmission controller 32 is configured to subtract the correction value VC from the speed VR to calculate the updated speed VR when the current positional difference PD is larger than the previous positional difference PD. The transmission controller 32 is configured to add the correction value VC to the speed VR to calculate the updated speed VR when the current positional difference PD is smaller than the previous positional difference PD. The transmission controller 32 is configured to store the current positional difference PD as a reference positional difference PD0 in the memory 32B. The reference positional difference PD0 corresponds to the previous positional difference PD in the next shifting operation at the same shift position.

One of the position sensor 30 and the transmission controller 32 is configured to calculate a rotational speed of the plurality of sprockets S1 to S12 based on the rotational position sensed by the position sensor 30. In this embodiment, the transmission controller 32 is configured to periodically calculate the rotational speed of the plurality of sprockets S1 to S12 based on the rotational position sensed by the position sensor 30. The transmission controller 32 is configured to store the calculated rotational speed in the memory 32B. However, the position sensor 30 can be configured to calculate the rotational speed of the plurality of sprockets S1 to S12 based on the rotational position sensed by the position sensor 30.

The transmission controller 32 is configured to determine the actual timing of the shifting operation based on change in the rotational speed calculated by the one of the position sensor 30 and the transmission controller 32. The transmission controller 32 is configured to determine the actual timing of the shifting operation based on change in the rotational speed calculated by the transmission controller 32. In this embodiment, the transmission controller 32 is configured to periodically subtract the latest rotational position from the previous rotational position to calculate an amount of change VD in the rotational speed as an absolute value. Thus, the amount of change VD in the rotational speed is a positive number. The transmission controller 32 is configured to temporarily store the amount of change VD in the rotational speed in the memory 32B.

The transmission controller 32 is configured to determine whether the amount of change VD in the rotational speed is larger than a threshold value VTH stored in the memory 32B after receiving the shift operation signal from the rear operating device 7. The transmission controller 32 is configured to control the guide actuator 9B to move the chain guide 9A from the sprocket of the current shift position toward the neighboring sprocket in response to the shift operation signal. After the amount of change VD in the rotational speed exceeds the threshold value VTH, the bicycle chain C engages with the neighboring sprocket to substantially transmit a pedaling force to the neighboring sprocket. Namely, the shifting operation is almost completed when the amount of change VD in the rotational speed exceeds the threshold value VTH. Thus, the transmission controller 32 concludes that the timing at which the amount of change VD in the rotational speed exceeds the threshold value VTH is the actual timing of the shifting operation. The transmission controller 32 stores, as the actual shifting-operation position PA, the rotational position sensed by the position sensor 30 at a timing at which the amount of change VD in the rotational speed exceeds the variation threshold value VTH.

FIG. 9 shows an example of a list of the target shifting-operation positions PT stored in the memory 32B. Each of the shifting facilitation structures FS1 to FS12 has the target shifting-operation position PT. In this embodiment, the shifting facilitation recesses FSU11 to FSU14 and FSD11 to FSD14 of the shifting facilitation structure FS1 of the sprocket S1 have the target shifting-operation positions PTU11 to PTU14 and PTD11 to PTD14. The shifting facilitation recesses FSU21 to FSU24 and FSD21 to FSD24 of the shifting facilitation structure FS2 of the sprocket S2 have the target shifting-operation positions PTU21 to PTU24 and PTD21 to PTD24. The shifting facilitation recesses FSU31 to FSU34 and FSD31 to FSD34 of the shifting facilitation structure FS3 of the sprocket S3 have the target shifting-operation positions PTU31 to PTU34 and PTD31 to PTD34. The shifting facilitation structures FS4 to FS12 have the target shifting-operation positions PT in the same manner as the shifting facilitation structures FS1 to FS3. The transmission controller 32 stores the target shifting-operation positions PT illustrated in FIG. 9.

The transmission controller 32 is configured to select one of the target shifting-operation positions PT based on selection angular ranges AR and the current rotational position of the plurality of sprockets S1 to S12 when the transmission controller 32 receives the shift operation signal. For example, the selection angular ranges ARU11 to ARU14 and ARD11 to ARD14 respectively correspond to the actual shifting-operation positions PTU11 to PTU14 and PTD11 to PTD14.

In a case where the current shift position corresponds to the sprocket S1 and where the rotational position sensed by the position sensor 30 is within one of the selection angular ranges ARU11 to ARU14 when the transmission controller 32 receives the upshift operation signal from the rear operating device 7, the transmission controller 32 selects one of the target shifting-operation positions PTU11 to PTU14 corresponding to the one of the selection angular ranges ARU11 to ARU14. In a case where the current shift position corresponds to the sprocket S2 and where the rotational position sensed by the position sensor 30 is within one of the selection angular ranges ARD11 to ARD14 when the transmission controller 32 receives the downshift operation signal from the rear operating device 7, the transmission controller 32 selects one of the target shifting-operation positions PTD11 to PTD14 corresponding to the one of the selection angular ranges ARD11 to ARD14.

The transmission controller 32 stores reference positional differences PD0 in the memory 32B. For example, the reference positional differences PDU11 to PDU14 respectively correspond to the target shifting-operation positions PTU11 to PTU14. The reference positional differences PDD11 to PDD14 respectively correspond to the target shifting-operation positions PTD11 to PTD14. The reference positional difference PD0 indicates a positional difference between the actual shifting-operation position PA and the target shifting-operation position PT in the previous shifting operation at the same shift position. For example, an initial value of the reference positional difference PD0 is zero. The transmission controller 32 stores the positional difference PD as the reference positional difference PD0 when calculating the positional difference PD.

FIG. 10 shows an example of a list of the speeds VR stored in the memory 32B. The speed VR relates to the current shift position and the shifting operation. For example, the transmission controller 32 controls the guide actuator 9B to move the chain guide 9A with the speed VRU1 in upshifting from the sprocket S1 to the sprocket S2. The transmission controller 32 controls the guide actuator 9B to move the chain guide 9A with the speed VRD1 in downshifting from the sprocket S2 to the sprocket S1. The speed VR can be indicated with a rotational angle per unit time.

The transmission controller 32 stores correction values VC of the speeds VR in the memory 32B. The correction value VC relates to the current shift position and the shifting operation. For example, the transmission controller 32 selects the correction value VCU1 when selecting the speed VRU1. The transmission controller 32 selects the correction value VCD1 when selecting the speed VRD1.

The transmission controller 32 stores original speed V0 of the speed VR in the memory 32B. For example, the original speed VOU1 corresponds to the speed VRU1. The original speed VOD1 corresponds to the speed VRD1. An initial value of the speed VR is the original speed VO. The speed VR is initialized to the original speed VO when the shifting control apparatus 12 is reset. For example, the shifting control apparatus 12 is reset by a user using a rest button (not shown) after the rear multiple sprocket 5 and/or the bicycle chain C is replaced with a new rear multiple sprocket and/or a new bicycle chain.

The control of the shifting control apparatus 12 will be described below referring to FIGS. 11 and 12.

Figure 11:
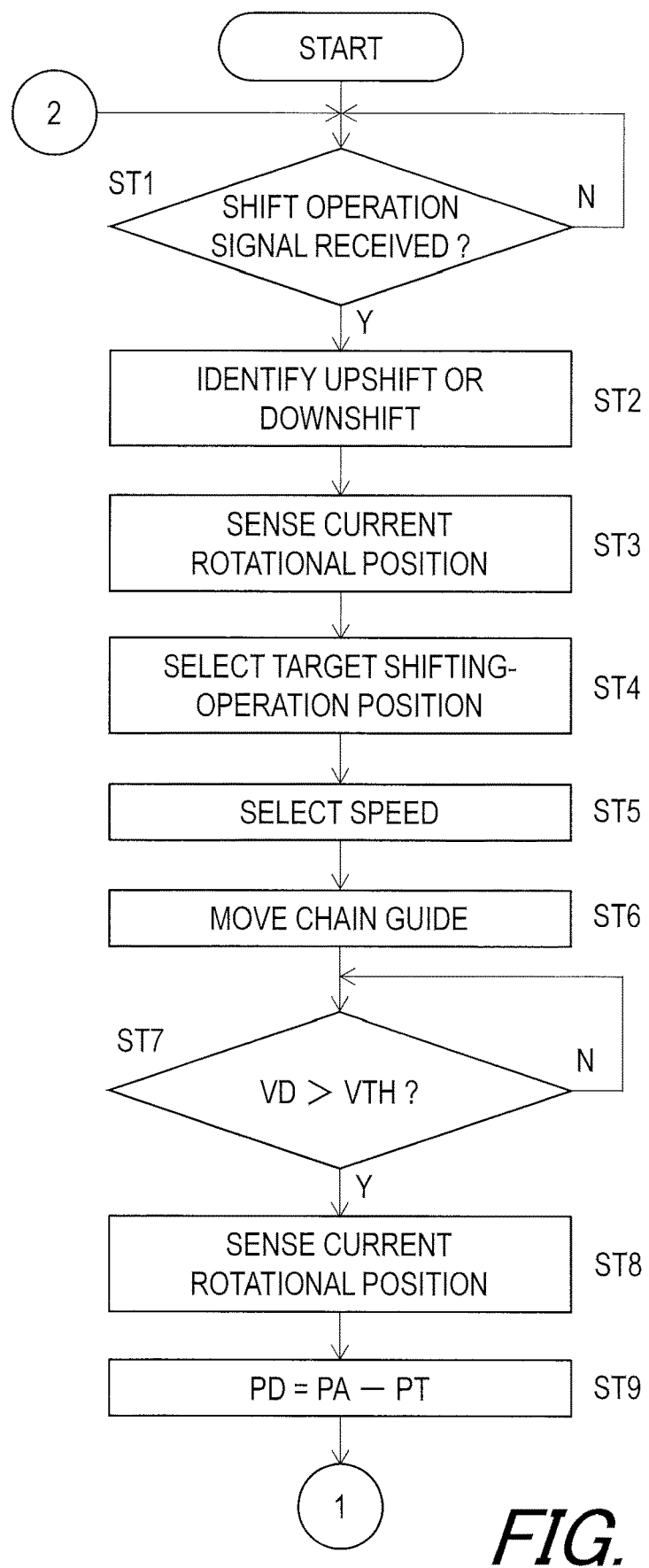
FIGS. 11 and 12 are flow charts showing the control of the shifting control apparatus illustrated in FIG. 8.

As seen in FIG. 11, the transmission controller 32 determines whether the transmission controller 32 receives the shift operation signal from the rear operating device 7 (Step ST1). The transmission controller 32 identifies the upshift operation signal or the downshift operation signal based on the shift operation signal transmitted from the rear operating device 7 (Steps ST1 and ST2).

The position sensor 30 senses the current rotational position of the plurality of sprockets S1 to S12 when the transmission controller 32 receives the shift operation signal from the rear operating device 7 (Step ST3). Specifically, the transmission controller 32 selects the current rotational position stored in the memory 32B when the transmission controller 32 receives the shift operation signal from the rear operating device 7. The transmission controller 32 selects one of the target shifting-operation positions PT (FIG. 9) stored in the memory 32B based on the current shift position, the shift operation signal, and the selection angular ranges AR (Step ST4).

The transmission controller 32 selects one of the speeds VR (FIG. 10) stored in the memory 32B based on the current shift position and the shift operation signal (Step ST5). The transmission controller 32 controls the guide actuator 9B to move the chain guide 9A with the speed VR in response to the shift operation signal transmitted from the rear operating device 7 (Step ST6).

The transmission controller 32 determines the actual timing of the shifting operation based on change in the rotational speed calculated by the transmission controller 32. In this embodiment, the transmission controller 32 compares the amount of change VD in the rotational speed with the variation threshold value VTH to determine the actual timing of the shifting operation (Step ST7). The position sensor 30 senses the current rotational position of the plurality of sprockets S1 to S12 when the amount of change VD exceeds the variation threshold value VTH (Steps ST7 and ST8). Specifically, the transmission controller 32 selects the current rotational position stored in the memory 32B when the transmission controller 32 concludes that the amount of change VD exceeds the variation threshold value VTH. The transmission controller 32 subtracts the target shifting-operation position PT from the actual shifting-operation position PA to calculate the positional difference PD (Step ST9).

Figure 12:
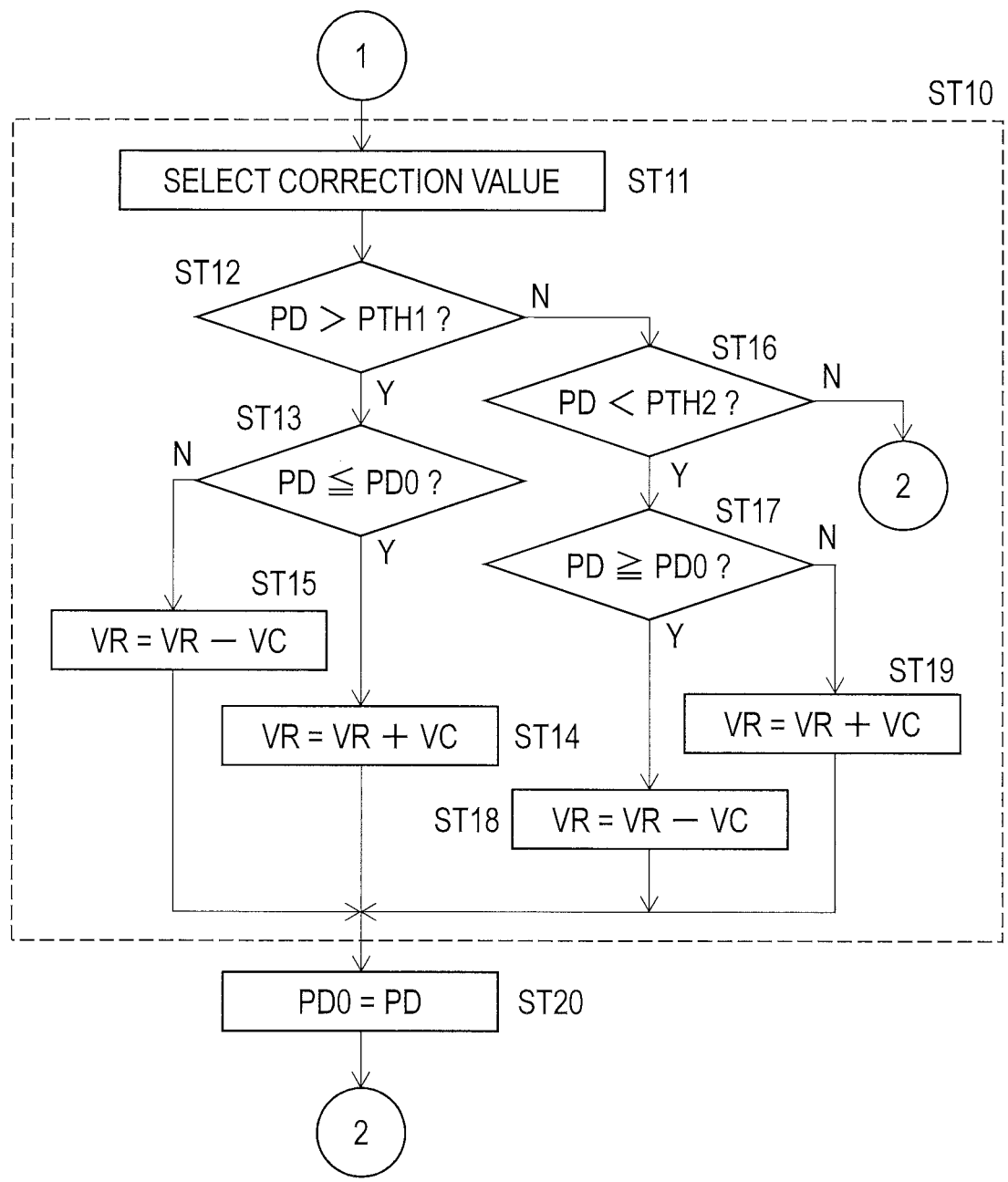

As seen in FIG. 12, the transmission controller 32 changes the speed VR relating to the movement of the chain guide 9A based on the target shifting-operation position PT and the actual shifting-operation position PA (Step ST10). In this embodiment, the transmission controller 32 increases the speed VR relating to the movement of the chain guide 9A in the first case where the positional difference PD indicates that the actual shifting-operation position PA is offset from the target shifting-operation position PT in the driving rotational direction D11 (FIG. 7) (Step S12 to ST14). The transmission controller 32 decreases the speed VR relating to the movement of the chain guide 9A in the second case where the positional difference PD indicates that the actual shifting-operation position PA is offset from the target shifting-operation position PT in the reverse rotational direction D12 (FIG. 7) (Step ST11 and ST16 to ST18).

Specifically, the transmission controller 32 selects the correction value VC corresponding the speed VR selected in Step ST5 from among the correction values VC (FIG. 10) stored in the memory 32B (Step ST11). The transmission controller 32 determines whether the positional difference PD is larger than the upper threshold value PTH1 (Steps ST11 and ST12). The positional difference PD indicates that the actual shifting-operation position PA is offset from the target shifting-operation position PT in the driving rotational direction D11 since the upper threshold value PTH1 is a positive number.

To determine whether the previous change in the speed VR is preferable in the same shift position, the transmission controller 32 determines whether the positional difference PD is equal to or smaller than a reference positional difference PD0 when the transmission controller 32 concludes that the positional difference PD is larger than the upper threshold value PTH1 (Steps ST12 and ST13). The transmission controller 32 adds the correction value VC selected in the Step ST11 to the speed VR selected in Step ST5 to calculate the speed VR when the transmission controller 32 concludes that the positional difference PD is equal to or smaller than the reference positional difference PD0 (Steps ST13 and ST14). The transmission controller 32 subtracts the correction value VC selected in the Step ST11 from the speed VR selected in Step ST5 to calculate the speed VR when the transmission controller 32 concludes that the positional difference PD is larger than a reference positional difference PD0 (Steps ST13 and ST15). The transmission controller 32 stores the newly calculated speed VR in the memory 32B as the speed VR. The transmission controller 32 uses the stored speed VR to move the chain guide 9A in the next shifting operation in the same shift position.

The transmission controller 32 determines whether the positional difference PD is smaller than the lower threshold value PTH2 when the transmission controller 32 concludes that the positional difference PD is equal to or smaller than the upper threshold value PTH1 (Steps S12 and S16). The positional difference PD indicates that the actual shifting-operation position PA is offset from the target shifting-operation position PT in the reverse rotational direction D12 since the lower threshold value PTH2 is a negative number. The process returns to Step ST1 without calculating the speed VR when the transmission controller 32 concludes that the positional difference PD is equal to or larger than the lower threshold value PTH2 (Step ST16).

To determine whether the previous change in the speed VR is preferable in the same shift position, the transmission controller 32 determines whether the positional difference PD is equal to or larger than the reference positional difference PD0 when the transmission controller 32 concludes that the positional difference PD is smaller than the lower threshold value PTH2 (Steps S16 and S17). The transmission controller 32 subtracts the correction value VC selected in the Step ST11 from the speed VR selected in Step ST5 to calculate the speed VR when the transmission controller 32 concludes that the positional difference PD is equal to or larger than the reference positional difference PD0 (Steps ST17 and ST18). The transmission controller 32 adds the correction value VC selected in the Step ST11 to the speed VR selected in Step ST5 to calculate the speed VR when the transmission controller 32 concludes that the positional difference PD is smaller than a reference positional difference PD0 (Steps ST17 and ST19). The transmission controller 32 stores the newly calculated speed VR in the memory 32B as the speed VR. The transmission controller 32 uses the stored speed VR to move the chain guide 9A in the next shifting operation in the same shift position.

The transmission controller 32 stores the positional difference PD calculated in Step ST9 as the reference positional difference PD0 in the memory 32B (Step ST20). The transmission controller 32 uses the stored reference positional difference PD0 in the next shifting operation in the same shift position. The process returns to Step ST1.

Second Embodiment

A shifting control apparatus 212 in accordance with a second embodiment will be described below referring to FIGS. 13 to 15. The shifting control apparatus 212 has the same structure and/or configuration as those of the shifting control apparatus 12 except for the transmission controller 32. Thus, elements having substantially the same function as those in the first embodiment will be numbered the same here and will not be described and/or illustrated again in detail here for the sake of brevity.

Figure 13:
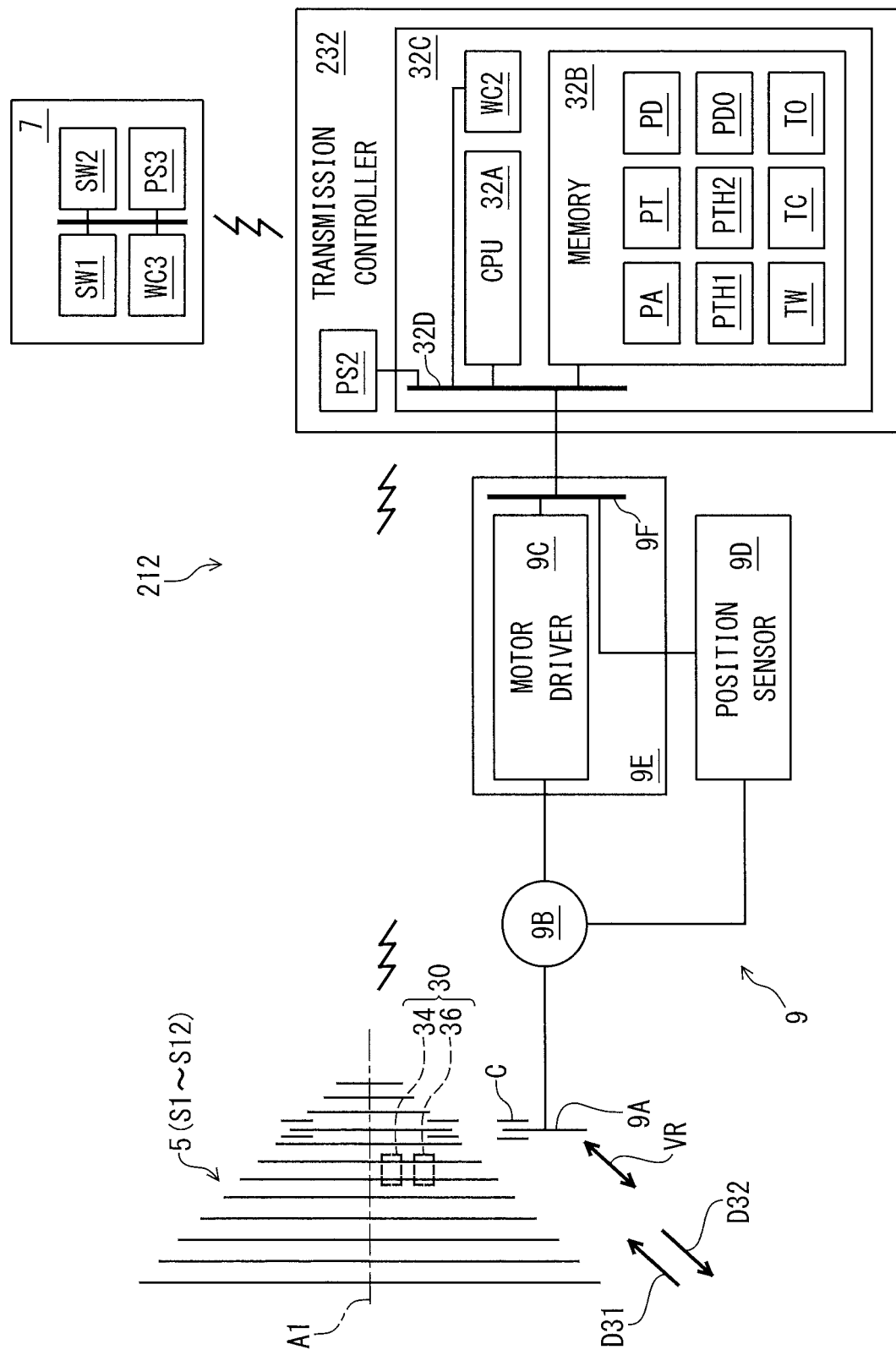
FIG. 13 is a schematic block diagram of a bicycle shifting control apparatus in accordance with a second embodiment.

As seen in FIG. 13, the shifting control apparatus 212 comprises the position sensor 30 and a transmission controller 232. The transmission controller 232 is configured to control the derailleur 9 to move the chain guide 9A of the derailleur 9 relative to the plurality of sprockets S1 to S12 in the shifting operation. The transmission controller 232 is configured to change at least one of the speed relating to the movement of the chain guide 9A, the start timing relating to the movement of the chain guide 9A, and the distance relating to the movement of the chain guide 9A based on the target shifting-operation position PT of the plurality of sprockets S1 to S12 and the rotational position sensed as the actual shifting-operation position PA by the position sensor 30 at the actual timing of the shifting operation.

The transmission controller 232 has substantially the same structure as that of the transmission controller 32 of the first embodiment. In this embodiment, the transmission controller 232 is configured to change the start timing relating to the movement of the chain guide 9A based on the target shifting-operation position PT of the plurality of sprockets S1 to S12 and the rotational position sensed as the actual shifting-operation position PA by the position sensor 30 at the actual timing of the shifting operation.

The transmission controller 232 is configured to advance the start timing relating to the movement of the chain guide 9A in one of the first case where the positional difference PD indicates that the actual shifting-operation position PA is offset from the target shifting-operation position PT in the driving rotational direction D11 of the plurality of sprockets S1 to S12 and the second case where the positional difference PD indicates that the actual shifting-operation position PA is offset from the target shifting-operation position PT in the reverse rotational direction D12 opposite to the driving rotational direction D11. The transmission controller 232 is configured to delay the start timing relating to the movement of the chain guide 9A in the other of the first case and the second case.

In this embodiment, the transmission controller 232 is configured to advance the start timing relating to the movement of the chain guide 9A in the first case where the positional difference PD indicates that the actual shifting-operation position PA is offset from the target shifting-operation position PT in the driving rotational direction D11. The transmission controller 232 is configured to delay the start timing relating to the movement of the chain guide 9A in the second case where the positional difference PD indicates that the actual shifting-operation position PA is offset from the target shifting-operation position PT in the reverse rotational direction D12. However, the transmission controller 232 can be configured to advance the start timing relating to the movement of the chain guide 9A in the second case. The transmission controller 232 can be configured to delay the start timing relating to the movement of the chain guide 9A in the first case.

The transmission controller 232 is configured to shorten a waiting time TW for a start of the movement of the chain guide 9A in the first case. The transmission controller 232 is configured to lengthen the waiting time TW for the start of the movement of the chain guide 9A in the second case. The waiting time TW is a time defined from receipt of the shift operation signal to the start of the movement of the chain guide 9A.

FIG. 14 shows an example of a list of the waiting time TW stored in the memory 32B. The waiting time TW relates to the current shift position and the shifting operation. For example, the transmission controller 232 controls the guide actuator 9B to move the chain guide 9A with the waiting time TWU1 in upshifting from the sprocket S1 to the sprocket S2. The transmission controller 232 controls the guide actuator 9B to move the chain guide 9A with the waiting time TWD1 in downshifting from the sprocket S2 to the sprocket S1.

The transmission controller 232 stores correction values TC of the waiting time TW in the memory 32B. The correction value TC relates to the current shift position and the shifting operation. For example, the transmission controller 232 selects the correction value TCU1 when selecting the waiting time TWU1. The transmission controller 232 selects the correction value TCD1 when selecting the waiting time TWD1.

The transmission controller 232 stores original waiting time TO of the waiting time TW in the memory 32B. For example, the original waiting time TOU1 corresponds to the waiting time TWU1. The original waiting time TOD1 corresponds to the waiting time TWD1. An initial value of the waiting time TW is the original waiting time TO. The waiting time TW is initialized to the original waiting time TO when the shifting control apparatus 12 is reset. For example, the shifting control apparatus 12 is reset by a user using a rest button (not shown) after the rear multiple sprocket 5 and/or the bicycle chain C is replaced with a new rear multiple sprocket and/or a new bicycle chain.

Figure 15:
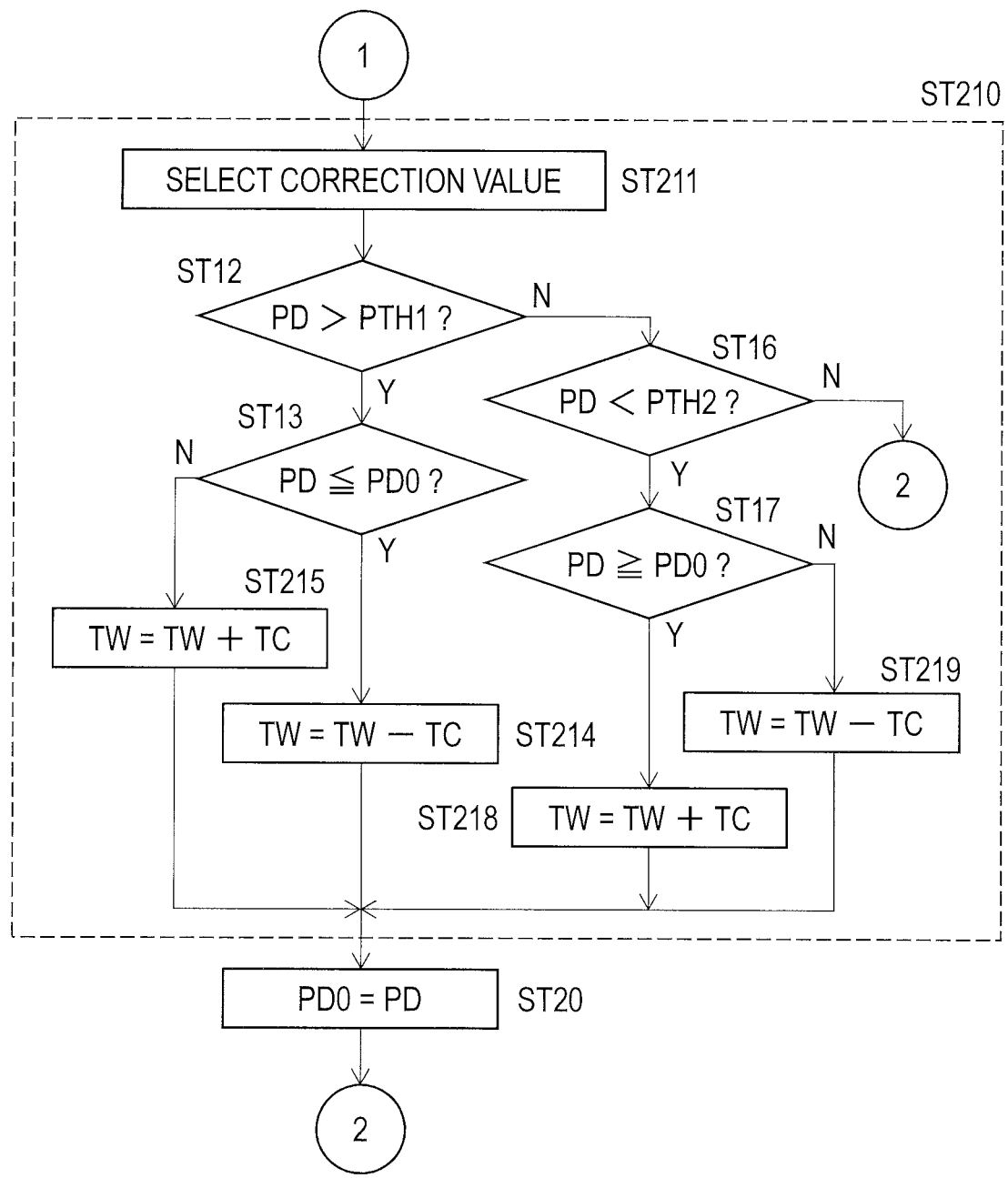
FIG. 15 is a flow chart showing the control of the shifting control apparatus illustrated in FIG. 13.

As seen in FIG. 15, in the control of the transmission controller 232, Steps ST10, ST14, ST15, ST18, and ST19 are replaced with Steps ST210, ST211, ST214, ST215, ST218, and ST219. In these Steps, the speed VR and the correction value VC are replaced with the waiting time TW and the correction value TC. Thus, they will not be described in detail here for the sake of brevity.

Third Embodiment

A shifting control apparatus 312 in accordance with a third embodiment will be described below referring to FIGS. 16 to 18. The shifting control apparatus 312 has the same structure and/or configuration as those of the shifting control apparatus 12 except for the transmission controller 32. Thus, elements having substantially the same function as those in the above embodiments will be numbered the same here and will not be described and/or illustrated again in detail here for the sake of brevity.

Figure 16:
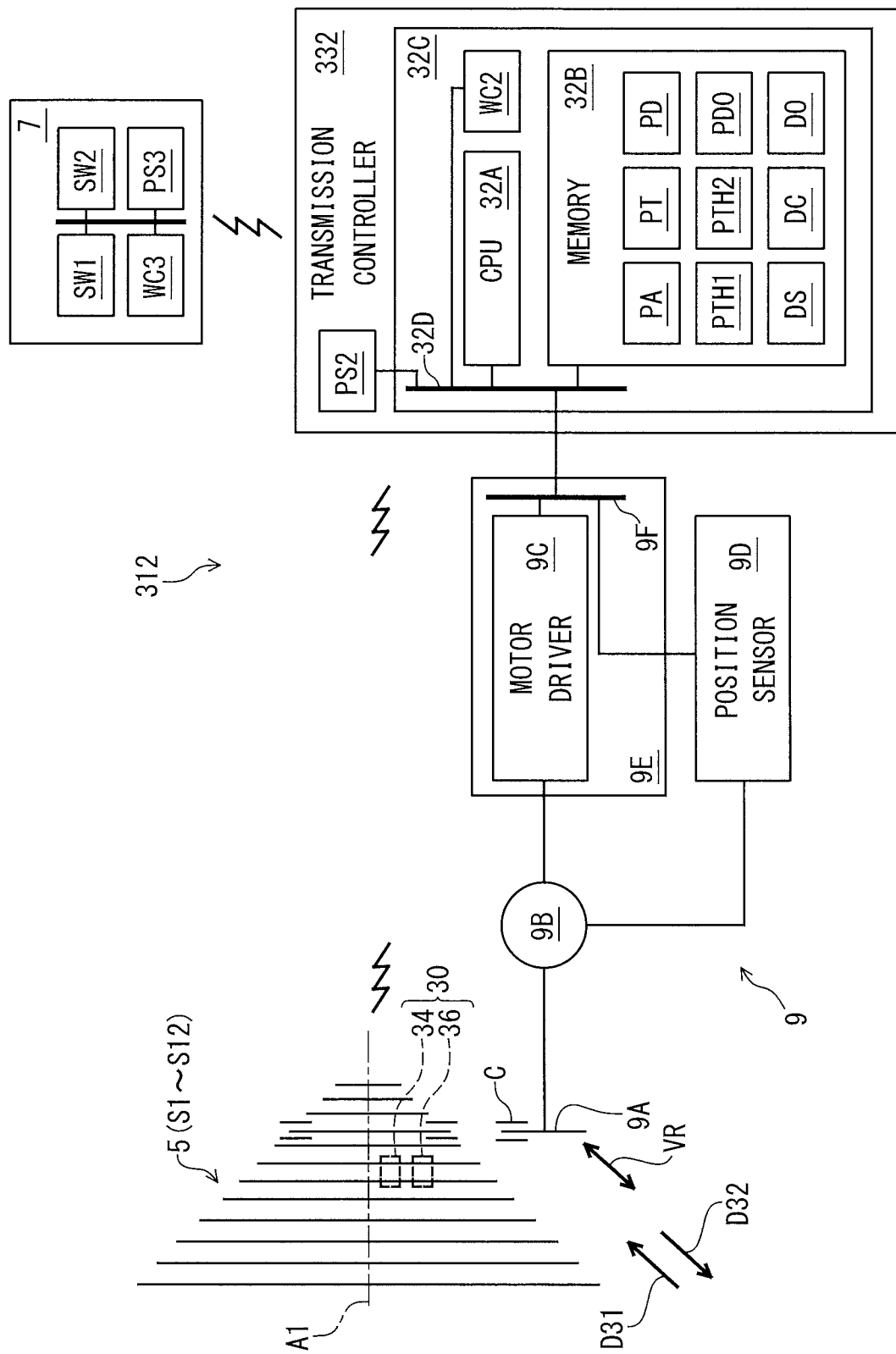
FIG. 16 is a schematic block diagram of a bicycle shifting control apparatus in accordance with a third embodiment.

As seen in FIG. 16, the shifting control apparatus 312 comprises the position sensor 30 and a transmission controller 332. The transmission controller 332 is configured to control the derailleur 9 to move the chain guide 9A of the derailleur 9 relative to the plurality of sprockets S1 to S12 in the shifting operation. The transmission controller 332 is configured to change at least one of the speed relating to the movement of the chain guide 9A, the start timing relating to the movement of the chain guide 9A, and the distance relating to the movement of the chain guide 9A based on the target shifting-operation position PT of the plurality of sprockets S1 to S12 and the rotational position sensed as the actual shifting-operation position PA by the position sensor 30 at the actual timing of the shifting operation.

The transmission controller 332 has substantially the same structure as that of the transmission controller 32 of the first embodiment. In this embodiment, the transmission controller 332 is configured to change the distance relating to the movement of the chain guide 9A based on the target shifting-operation position PT of the plurality of sprockets S1 to S12 and the rotational position sensed as the actual shifting-operation position PA by the position sensor 30 at the actual timing of the shifting operation.

The transmission controller 332 is configured to shorten the distance relating to the movement of the chain guide 9A in one of the first case where the positional difference PD indicates that the actual shifting-operation position PA is offset from the target shifting-operation position PT in the driving rotational direction D11 of the plurality of sprockets and the second case where the positional difference PD indicates that the actual shifting-operation position PA is offset from the target shifting-operation position PT in the reverse rotational direction D12 opposite to the driving rotational direction D11. The transmission controller 332 is configured to lengthen the distance relating to the movement of the chain guide 9A in the other of the first case and the second case.

In this embodiment, the transmission controller 332 is configured to shorten the distance DS relating to the movement of the chain guide 9A in the first case where the positional difference PD indicates that the actual shifting-operation position PA is offset from the target shifting-operation position PT in the driving rotational direction D11. The transmission controller 332 is configured to lengthen the distance DS relating to the movement of the chain guide 9A in the second case where the positional difference PD indicates that the actual shifting-operation position PA is offset from the target shifting-operation position PT in the reverse rotational direction D12. However, the transmission controller 332 can be configured to shorten the distance DS relating to the movement of the chain guide 9A in the second case. The transmission controller 332 can be configured to lengthen the distance DS relating to the movement of the chain guide 9A in the first case.

FIG. 17 shows an example of a list of the distance DS stored in the memory 32B. The distance DS relates to the current shift position and the shifting operation. For example, the transmission controller 332 controls the guide actuator 9B to move the chain guide 9A with the distance DSU1 in upshifting from the sprocket S1 to the sprocket S2. The transmission controller 332 controls the guide actuator 9B to move the chain guide 9A with the distance DSD1 in downshifting from the sprocket S2 to the sprocket S1.

The transmission controller 332 stores correction values DC of the distance DS in the memory 32B. The correction value DC relates to the current shift position and the shifting operation. For example, the transmission controller 332 selects the correction value DCU1 when selecting the distance DSU1. The transmission controller 332 selects the correction value DCD1 when selecting the distance DSD1.

The transmission controller 332 stores original distance DO of the distance DS in the memory 32B. For example, the original distance DOU1 corresponds to the distance DSU1. The original distance DOD1 corresponds to the distance DSD1. An initial value of the distance DS is the original distance DO. The distance DS is initialized to the original distance DO when the shifting control apparatus 12 is reset. For example, the shifting control apparatus 12 is reset by a user using a rest button (not shown) after the rear multiple sprocket 5 and/or the bicycle chain C is replaced with a new rear multiple sprocket and/or a new bicycle chain.

Figure 18:
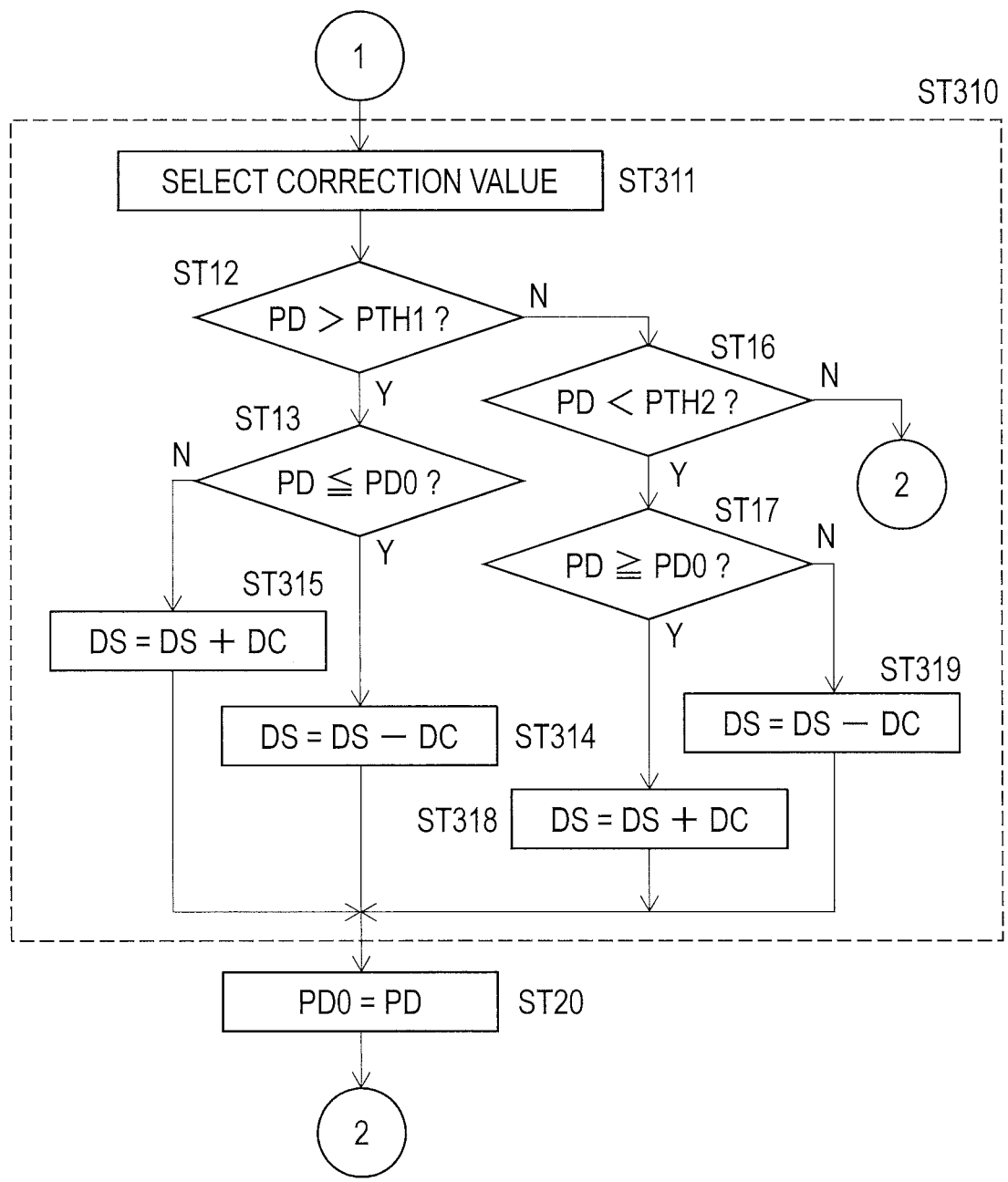
FIG. 18 is a flow chart showing the control of the shifting control apparatus illustrated in FIG. 16.

As seen in FIG. 18, in the control of the transmission controller 332, Steps ST10, ST14, ST15, ST18, and ST19 are replaced with Steps ST310, ST311, ST314, ST315, ST318, and ST319. In these Steps, the speed VR and the correction value VC are replaced with the distance DS and the correction value DC. Thus, they will not be described in detail here for the sake of brevity.

Fourth Embodiment

A shifting control apparatus 412 in accordance with a fourth embodiment will be described below referring to FIGS. 19 and 20. The shifting control apparatus 412 has the same structure and/or configuration as those of the shifting control apparatus 12 except for the transmission controller 32 and a state sensor. Thus, elements having substantially the same function as those in the above embodiments will be numbered the same here and will not be described and/or illustrated again in detail here for the sake of brevity.

Figure 19:
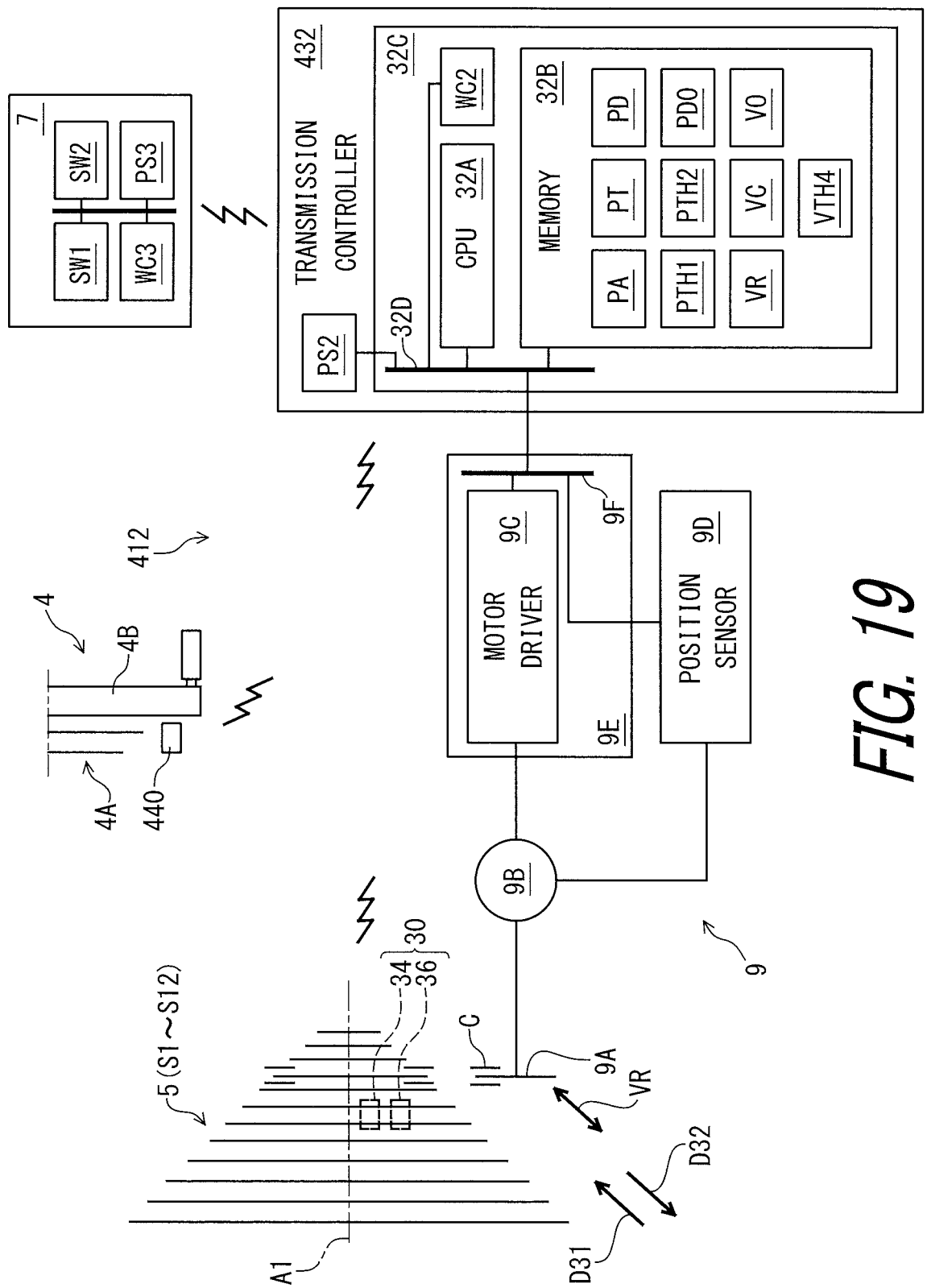
FIG. 19 is a schematic block diagram of a bicycle shifting control apparatus in accordance with a fourth embodiment.

As seen in FIG. 19, the shifting control apparatus 412 comprises the position sensor 30 and a transmission controller 432. The transmission controller 432 is configured to control the derailleur 9 to move the chain guide 9A of the derailleur 9 relative to the plurality of sprockets S1 to S12 in the shifting operation. The transmission controller 432 is configured to change at least one of the speed relating to the movement of the chain guide 9A, the start timing relating to the movement of the chain guide 9A, and the distance relating to the movement of the chain guide 9A based on the target shifting-operation position PT of the plurality of sprockets S1 to S12 and the rotational position sensed as the actual shifting-operation position PA by the position sensor 30 at the actual timing of the shifting operation.

The transmission controller 432 has substantially the same structure as that of the transmission controller 32 of the first embodiment. In this embodiment, the shifting control apparatus 412 further comprises a state sensor 440 configured to sense a rotating state of the front sprocket 4A. The transmission controller 432 is configured to determine the actual timing of the shifting operation based on the rotating state sensed by the state sensor 440.

The state sensor 440 includes a cadence sensor configured to sense a rotational speed of the crank assembly 4 with the right crank arm 4B. In this embodiment, as well as the position sensor 30, the state sensor 40 includes a wireless communicator and a power storage. The wireless communicator is electrically connected to the cadence sensor to wirelessly and periodically transmit the rotational speed sensed by the cadence sensor to the transmission controller 32. The wireless communicator and the power storage of the state sensor 40 have substantially the same structure and/or configuration as those of the wireless communicator WC1 and the power storage PS1 of the position sensor 30. Thus, they will not be described in detail here for the sake of brevity.

The transmission controller 432 is wirelessly connected to the state sensor 440 to periodically receive the rotational speed from the state sensor 440 via the wireless communicator WC2. However, the state sensor 440 is not limited to this embodiment. For example, the state sensor 440 can include a torque sensor configured to sense a pedaling torque applied to a crank axle of the crank assembly 4.

The transmission controller 432 is configured to determine the actual timing of the shifting operation based on change in the rotational speed sensed by the state sensor 440. One of the state sensor 440 and the transmission controller 432 is configured to calculate an amount of change VD4 in the rotational speed of the front sprocket 4A based on the rotational speed sensed by the state sensor 440. In this embodiment, the transmission controller 432 is configured to periodically calculate the amount of change VD4 in the rotational speed of the front sprocket 4A based on the rotational speed sensed by the state sensor 440. However, the state sensor 440 can be configured to calculate the amount of change VD4 in the rotational speed of the front sprocket 4A based on the rotational speed sensed by the state sensor 440.

In this embodiment, the transmission controller 432 is configured to periodically subtract the latest rotational position from the previous rotational position to calculate the amount of change VD4 in the rotational speed as an absolute value. Thus, the amount of change VD4 in the rotational speed is a positive number. The transmission controller 432 is configured to temporarily store the amount of change VD4 in the rotational speed in the memory 32B. The transmission controller 432 is configured to determine whether the amount of change VD4 in the rotational speed is larger than a threshold value VTH4 stored in the memory 32B after receiving the shift operation signal from the rear operating device 7. The description about the amount of change VD in the rotational speed in the first embodiment can also be utilized in this embodiment by replacing the amount of change VD and the threshold value VTH with the amount of change VD4 and the threshold value VTH4. Thus, they will not be described in detail here for the sake of brevity.

Figure 20:
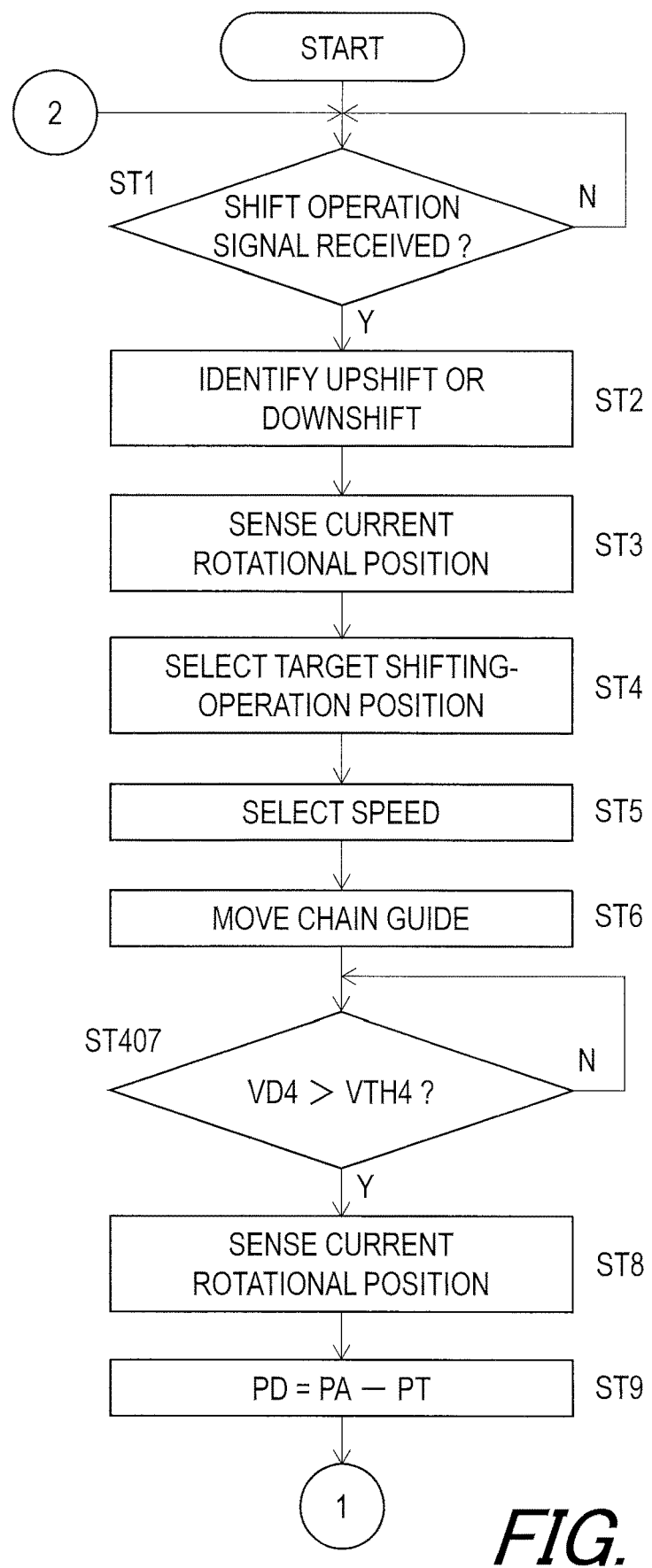
FIG. 20 is a flow chart showing the control of the shifting control apparatus illustrated in FIG. 19.

As seen in FIG. 20, in the control of the transmission controller 432, Step ST7 is replaced with Step ST407. In Step ST407, the amount of change VD in the rotational speed and the threshold value VTH are replaced with the amount of change VD4 in the rotational speed and the threshold value VTH4. Thus, they will not be described in detail here for the sake of brevity. The state sensor 440 can apply to the second and third embodiments in the same manner as the first embodiment.

Fifth Embodiment

A shifting control apparatus 512 in accordance with a fifth embodiment will be described below referring to FIGS. 21 and 22. The shifting control apparatus 512 has the same structure and/or configuration as those of the shifting control apparatus 12 except for the transmission controller 32 and a shock sensor. Thus, elements having substantially the same function as those in the above embodiments will be numbered the same here and will not be described and/or illustrated again in detail here for the sake of brevity.

Figure 21:
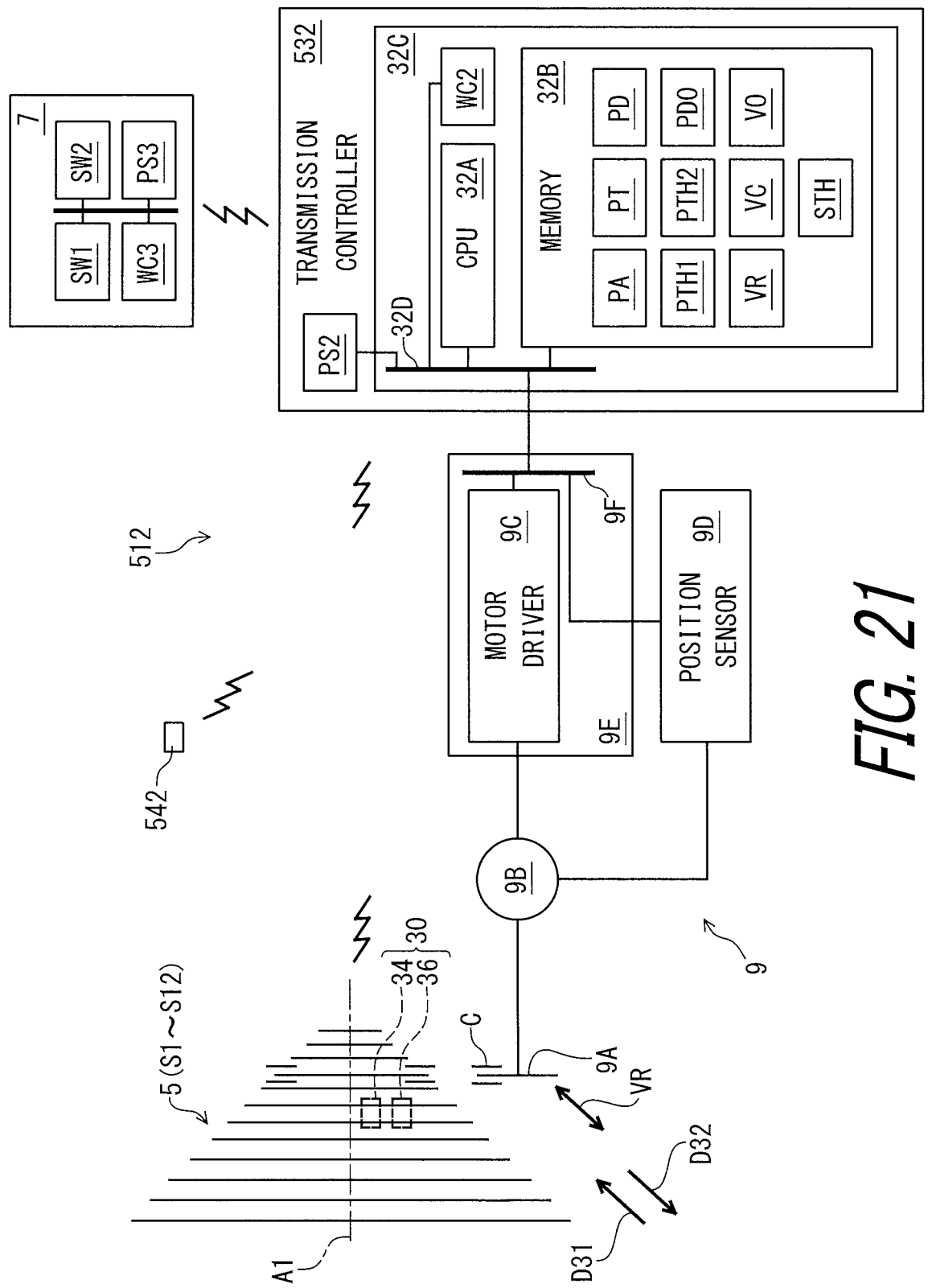
FIG. 21 is a schematic block diagram of a bicycle shifting control apparatus in accordance with a fifth embodiment.

As seen in FIG. 21, the shifting control apparatus 512 comprises the position sensor 30 and a transmission controller 532. The transmission controller 532 is configured to control the derailleur 9 to move the chain guide 9A of the derailleur 9 relative to the plurality of sprockets S1 to S12 in the shifting operation. The transmission controller 532 is configured to change at least one of the speed relating to the movement of the chain guide 9A, the start timing relating to the movement of the chain guide 9A, and the distance relating to the movement of the chain guide 9A based on the target shifting-operation position PT of the plurality of sprockets S1 to S12 and the rotational position sensed as the actual shifting-operation position PA by the position sensor 30 at the actual timing of the shifting operation.

The transmission controller 532 has substantially the same structure as that of the transmission controller 32 of the first embodiment. In this embodiment, the shifting control apparatus 512 further comprises a shock sensor 542 configured to sense a shock during the shifting-operation. In this embodiment, as well as the position sensor 30, the shock sensor 542 includes a wireless communicator and a power storage. The wireless communicator is configured to wirelessly and periodically transmit the sensed shock to the transmission controller 32. The wireless communicator and the power storage of the shock sensor 542 have substantially the same structure and/or configuration as those of the wireless communicator WC1 and the power storage PS1 of the position sensor 30. Thus, they will not be described in detail here for the sake of brevity.

The transmission controller 532 is configured to determine the actual timing of the shifting operation based on the shock sensed by the shock sensor 542. The transmission controller 532 is wirelessly connected to the shock sensor 542 to periodically receive the shock from the shock sensor 542 via the wireless communicator WC2. For example, the shock sensor 542 is attached to one of the bicycle frame 3, the crank assembly 4, the rear multiple sprocket 5, the derailleur 9, and the bicycle hub assembly 14.

The transmission controller 532 is configured to determine the actual timing of the shifting operation based on the shock sensed by the shock sensor 542. The transmission controller 532 is configured to determine whether the shock SK sensed by the shock sensor 542 is larger than a threshold value STH stored in the memory 32B after receiving the shift operation signal from the rear operating device 7. The description about the amount of change VD in the rotational speed in the first embodiment can also be utilized in this embodiment by replacing the amount of change VD and the threshold value VTH with the shock SK and the threshold value STH. Thus, they will not be described in detail here for the sake of brevity.

Figure 22:
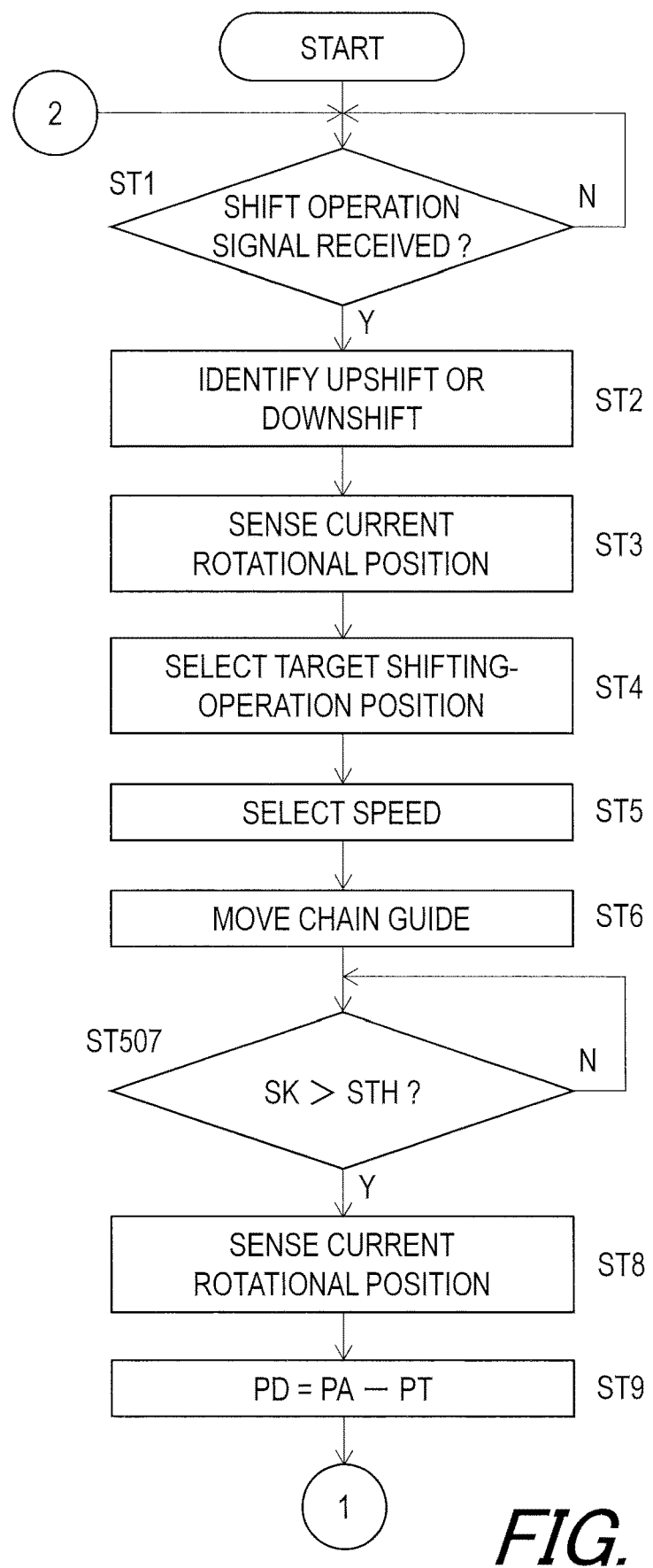
FIG. 22 is a flow chart showing the control of the shifting control apparatus illustrated in FIG. 21.

As seen in FIG. 22, in the control of the transmission controller 532, Step ST7 is replaced with Step ST507. In Step ST507, the amount of change VD in the rotational speed and the threshold value VTH are replaced with the shock SK and the threshold value STH. Thus, they will not be described in detail here for the sake of brevity. The shock sensor 542 can apply to the second and third embodiments in the same manner as the first embodiment.

Modifications

Each of the shifting control apparatuses 12, 212, 312, 412, and 512 of the first to fifth embodiments is configured to control the rear derailleur 9. However, at least one of the shifting control apparatuses 12, 212, 312, 412, and 512 of the first to fifth embodiments can be configured to control the front derailleur 8.

The configurations of the shifting control apparatuses 12, 212, 312, 412, and 512 of the first to fifth embodiments can be at least partly combined with each other. For example, the shifting control apparatus can be configured to change at least two of the speed, the start timing, and the distance relating to the movement of the chain guide 9A. Additionally, for example, the transmission controllers 232 and 332 can determine the actual timing of the shifting operation based on at least one of the rotating state sensed by the state sensor 440 and the shock sensed by the shock sensor 542.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A shifting control apparatus for a human powered vehicle, comprising:
a position sensor configured to sense a rotational position of a plurality of sprockets relative to a rotational reference position; and
a transmission controller configured to control a derailleur to move a chain guide of the derailleur relative to the plurality of sprockets in a shifting operation, the transmission controller being configured to change at least one of a speed relating to a movement of the chain guide, and a distance relating to the movement of the chain guide based on
a target shifting-operation position of the plurality of sprockets, and
the rotational position sensed as an actual shifting-operation position by the position sensor at an actual timing of the shifting operation,
the target shifting-operation position being defined as a rotational position of the plurality of sprockets relative to the rotational reference position at a preferable timing of the shifting operation.

2. The shifting control apparatus according to claim 1, wherein
the transmission controller is configured to calculate a positional difference between the target shifting-operation position and the actual shifting-operation position.

3. The shifting control apparatus according to claim 2, wherein
the transmission controller is configured to change the at least one of the speed, and the distance relating to the movement of the chain guide based on the positional difference.

4. The shifting control apparatus according to claim 3, wherein
the transmission controller is configured to increase the speed relating to the movement of the chain guide in one of a first case where the positional difference indicates that the actual shifting-operation position is offset from the target shifting-operation position in a driving rotational direction of the plurality of sprockets and a second case where the positional difference indicates that the actual shifting-operation position is offset from the target shifting-operation position in a reverse rotational direction opposite to the driving rotational direction, and
the transmission controller is configured to decrease the speed relating to the movement of the chain guide in the other of the first case and the second case.

5. The shifting control apparatus according to claim 3, wherein
the transmission controller is configured to advance a start timing relating to the movement of the chain guide in one of a first case where the positional difference indicates that the actual shifting-operation position is offset from the target shifting-operation position in a driving rotational direction of the plurality of sprockets and a second case where the positional difference indicates that the actual shifting-operation position is offset from the target shifting-operation position in a reverse rotational direction opposite to the driving rotational direction, and
the transmission controller is configured to delay the start timing relating to the movement of the chain guide in the other of the first case and the second case.

6. The shifting control apparatus according to claim 3, wherein
the transmission controller is configured to shorten the distance relating to the movement of the chain guide in one of a first case where the positional difference indicates that the actual shifting-operation position is offset from the target shifting-operation position in a driving rotational direction of the plurality of sprockets and a second case where the positional difference indicates that the actual shifting-operation position is offset from the target shifting-operation position in a reverse rotational direction opposite to the driving rotational direction, and
the transmission controller is configured to lengthen the distance relating to the movement of the chain guide in the other of the first case and the second case.

7. The shifting control apparatus according to claim 1, further comprising
a state sensor configured to sense a rotating state of a front sprocket, wherein
the transmission controller is configured to determine the actual timing of the shifting operation based on the rotating state sensed by the state sensor.

8. The shifting control apparatus according to claim 1, further comprising
a shock sensor configured to sense a shock during the shifting-operation, wherein
the transmission controller is configured to determine the actual timing of the shifting operation based on the shock sensed by the shock sensor.

9. The shifting control apparatus according to claim 1, wherein
a total number of the plurality of sprockets is equal to or larger than 9.

10. The shifting control apparatus according to claim 1, wherein
the plurality of sprockets includes a largest sprocket and a smallest sprocket, and
a tooth-number difference between a total number of teeth of the smallest sprocket and a total number of teeth of the largest sprocket is equal to or larger than 25.

11. The shifting control apparatus according to claim 1, wherein
the plurality of sprockets includes a largest sprocket and a smallest sprocket, and
a tooth-number difference between a total number of teeth of the smallest sprocket and a total number of teeth of the largest sprocket is equal to or larger than 35.

12. The shifting control apparatus according to claim 1, wherein
the plurality of sprockets includes a largest sprocket, and
a total number of teeth of the largest sprocket is equal to or larger than 44.

13. The shifting control apparatus according to claim 1, wherein
the plurality of sprockets includes a smallest sprocket, and
a total number of teeth of the smallest sprocket is equal to or smaller than 10.

14. The shifting control apparatus according to claim 1, wherein
the derailleur includes a rear derailleur.

15. A shifting control apparatus for a human powered vehicle, comprising:
a position sensor configured to sense a rotational position of a plurality of sprockets relative to a rotational reference position; and a transmission controller configured to control a derailleur to move a chain guide of the derailleur relative to the plurality of sprockets in a shifting operation, the transmission controller being configured to change at least one of a speed relating to a movement of the chain guide, a start timing relating to the movement of the chain guide, and a distance relating to the movement of the chain guide based on
- a target shifting-operation position of the plurality of sprockets, and
- the rotational position sensed as an actual shifting-operation position by the position sensor at an actual timing of the shifting operation, the target shifting-operation position being defined as a rotational position of the plurality of sprockets relative to the rotational reference position at a preferable timing of the shifting operation, wherein one of the position sensor and the transmission controller is configured to calculate a rotational speed of the plurality of sprockets based on the rotational position sensed by the position sensor, and the transmission controller is configured to determine the actual timing of the shifting operation based on change in the rotational speed calculated by the one of the position sensor and the transmission controller.

16. A shifting control apparatus for a human powered vehicle, comprising:
- a position sensor configured to sense a rotational position of a plurality of sprockets relative to a rotational reference position; and
- a transmission controller configured to control a derailleur to move a chain guide of the derailleur relative to the plurality of sprockets in a shifting operation, the transmission controller being configured to change at least one of a speed relating to a movement of the chain guide, a start timing relating to the movement of the chain guide, and a distance relating to the movement of the chain guide based on
  - a target shifting-operation position of the plurality of sprockets, and
  - the rotational position sensed as an actual shifting-operation position by the position sensor at an actual timing of the shifting operation, the target shifting-operation position being defined as a rotational position of the plurality of sprockets relative to the rotational reference position at a preferable timing of the shifting operation, wherein the transmission controller is configured to increase the speed relating to the movement of the chain guide in one of a first case where the actual shifting-operation position is offset from the target shifting-operation position in a driving rotational direction of the plurality of sprockets and a second case where the actual shifting-operation position is offset from the target shifting-operation position in a reverse rotational direction opposite to the driving rotational direction, and the transmission controller is configured to decrease the speed relating to the movement of the chain guide in the other of the first case and the second case.

* * * * *